(12) United States Patent
Huang

(10) Patent No.: US 10,440,562 B2
(45) Date of Patent: Oct. 8, 2019

(54) SYSTEM INFORMATION OBTAINING METHOD IN CELL CLUSTER, RELATED DEVICE, AND SYSTEM

(71) Applicant: HUAWEI TECHNOLOGIES CO., LTD., Shenzhen (CN)

(72) Inventor: Qufang Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/825,085

(22) Filed: Nov. 28, 2017

(65) Prior Publication Data

US 2018/0084408 A1 Mar. 22, 2018

Related U.S. Application Data

(63) Continuation of application No. PCT/CN2015/080345, filed on May 29, 2015.

(51) Int. Cl.
*H04W 36/00* (2009.01)
*H04W 8/24* (2009.01)
*H04W 72/04* (2009.01)
*H04W 48/12* (2009.01)
*H04W 8/00* (2009.01)
*H04W 36/04* (2009.01)
*H04W 48/14* (2009.01)

(52) U.S. Cl.
CPC ............. *H04W 8/24* (2013.01); *H04W 36/00* (2013.01); *H04W 48/12* (2013.01); *H04W 72/0413* (2013.01); *H04W 8/005* (2013.01); *H04W 36/04* (2013.01); *H04W 48/14* (2013.01)

(58) Field of Classification Search
CPC ... H04W 72/0413; H04W 8/005; H04W 8/24; H04W 36/0022; H04W 36/0033; H04W 36/0061; H04W 36/0083; H04W 48/12; H04W 76/19
See application file for complete search history.

(56) References Cited

U.S. PATENT DOCUMENTS 6,628,946 B1 9/2003 Wiberg et al.
2009/0185543 A1* 7/2009 Chen ..................... H04W 48/08
370/338
(Continued)

FOREIGN PATENT DOCUMENTS

CN 1371576 A 9/2002
CN 101562859 A 10/2009
(Continued)

*Primary Examiner* — Jean A Gelin
(74) *Attorney, Agent, or Firm* — Kilpatrick Townsend & Stockton LLP

(57) ABSTRACT

A method includes: obtaining, by a mobile device, a first part of system information needing to be used by any target cell in the cell cluster; and combining, by the mobile device, the first part of system information and a second part of system information that is prestored in the mobile device, to obtain system information needing to be used by the target cell; or replacing, by the mobile device, a part that is in prestored designated system information and that corresponds to the first part of system information with the first part of system information, and using updated designated system information as system information needing to be used by the target cell.

12 Claims, 17 Drawing Sheets

(56) References Cited

U.S. PATENT DOCUMENTS

| | | | | |
|---|---|---|---|---|
| 2010/0210268 A1* | 8/2010 | Lim | H04W 36/04 | 455/436 |
| 2010/0272015 A1* | 10/2010 | Chmiel | H04W 48/12 | 370/328 |
| 2011/0105120 A1* | 5/2011 | Abdel-Samad | H04W 48/16 | 455/436 |
| 2011/0244904 A1 | 10/2011 | Sagae et al. | | |
| 2011/0294508 A1 | 12/2011 | Min et al. | | |
| 2012/0094699 A1* | 4/2012 | Tamura | H04W 48/12 | 455/458 |
| 2012/0115485 A1* | 5/2012 | Narasimha | H04W 68/02 | 455/437 |
| 2013/0231114 A1* | 9/2013 | Jayanthi | H04W 64/00 | 455/436 |
| 2013/0303153 A1* | 11/2013 | Bontu | H04L 1/0026 | 455/423 |
| 2014/0198685 A1* | 7/2014 | Xu | H04W 24/02 | 370/254 |
| 2014/0286315 A1 | 9/2014 | Chen et al. | | |
| 2014/0315549 A1* | 10/2014 | Zhang | H04W 48/08 | 455/434 |
| 2015/0011213 A1 | 1/2015 | Lou et al. | | |
| 2015/0092630 A1* | 4/2015 | Lin | H04L 5/14 | 370/280 |
| 2015/0119054 A1* | 4/2015 | Morioka | H04W 76/10 | 455/450 |
| 2015/0215825 A1* | 7/2015 | Kim | H04W 36/0088 | 370/331 |
| 2015/0237545 A1* | 8/2015 | Takano | H04W 48/10 | 370/331 |
| 2015/0257173 A1 | 9/2015 | You et al. | | |
| 2015/0334589 A1* | 11/2015 | Yang | H04W 76/048 | 370/252 |
| 2015/0334697 A1* | 11/2015 | Song | H04W 48/12 | 455/450 |
| 2016/0165638 A1* | 6/2016 | Ozturk | H04W 68/02 | 370/329 |
| 2016/0316431 A1* | 10/2016 | Zhu | H04W 52/0229 | |
| 2016/0345314 A1* | 11/2016 | Webb | H04W 4/70 | |
| 2017/0332247 A1* | 11/2017 | Hua | H04L 1/00 | |

FOREIGN PATENT DOCUMENTS

| | | |
|---|---|---|
| CN | 101686580 A | 3/2010 |
| CN | 103442387 A | 12/2013 |
| CN | 104066127 A | 9/2014 |
| EP | 2323426 A1 | 5/2011 |
| JP | 2010063034 A | 3/2010 |
| JP | 2013255061 A | 12/2013 |
| WO | 0072609 A1 | 11/2000 |
| WO | 2013068368 A1 | 5/2013 |
| WO | 2013068369 A1 | 5/2013 |
| WO | 2014069058 A1 | 5/2014 |
| WO | 2014109566 A1 | 7/2014 |

* cited by examiner

Base station device

2201
Mobile device

SYSTEM INFORMATION OBTAINING METHOD IN CELL CLUSTER, RELATED DEVICE, AND SYSTEM

CROSS-REFERENCE TO RELATED APPLICATIONS

This application is a continuation of International Application No. PCT/CN2015/080345, filed on May 29, 2015, the disclosure of which is hereby incorporated by reference in its entirety.

TECHNICAL FIELD

The present invention relates to the field of communications technologies, and in particular, to a system information obtaining method in a cell cluster, a related device, and a system.

BACKGROUND

Currently, to increase a capacity of a wireless communications market, the industry usually uses cell cluster deployment to enhance frequency reuse. A cell cluster is a service area in which multiple cells are deployed intensively. Deployment of the cell cluster may cause frequent cell handovers to a mobile device. Each cell periodically sends a system message, and the system message includes a basic access parameter of the cell. Each time when handed over to a cell, the mobile device needs to obtain system information of the cell, and access a network according to the system information of the cell. However, it is found in practice that when moving in the cell cluster, the mobile device usually needs to constantly read entire system information that is periodically broadcast by cells along the way. This not only brings high power consumption to the mobile device, but also reduces system information obtaining efficiency.

SUMMARY

Embodiments of the present invention disclose a system information obtaining method in a cell cluster, a related device, and a system, to improve efficiency of obtaining entire system information and reduce power consumption of a mobile device.

A first aspect of the embodiments of the present invention discloses a system information obtaining method in a cell cluster, including:

obtaining, by a mobile device, a first part of system information needing to be used by any target cell in the cell cluster; and combining, by the mobile device, the first part of system information and a second part of system information that is prestored in the mobile device, to obtain system information needing to be used by the target cell; or replacing, by the mobile device, a part that is in prestored designated system information and that corresponds to the first part of system information with the first part of system information, and using updated designated system information as system information needing to be used by the target cell.

In a first possible implementation of the first aspect of the embodiments of the present invention, the method further includes:

receiving, by the mobile device, the second part of system information sent by a primary cell, and storing the second part of system information, where the cell cluster is in a coverage area of the primary cell, and the second part of system information is a same part of system information needing to be used by all cells in the cell cluster; or receiving, by the mobile device, the designated system information sent by a primary cell, and storing the designated system information, where the designated system information includes the second part of system information and the part that corresponds to the first part of system information and that needs to be used by all cells in the cell cluster.

With reference to the first possible implementation of the first aspect of the embodiments of the present invention, in a second possible implementation of the first aspect of the embodiments of the present invention, the obtaining, by a mobile device, a first part of system information needing to be used by any target cell in the cell cluster includes:

obtaining, by the mobile device after entering a coverage area of any target cell in the cell cluster, the first part of system information needing to be used by the target cell.

With reference to the second possible implementation of the first aspect of the embodiments of the present invention, in a third possible implementation of the first aspect of the embodiments of the present invention, the obtaining, by the mobile device after entering a coverage area of any target cell in the cell cluster, the first part of system information needing to be used by the target cell includes:

receiving, by the mobile device after entering the coverage area of any target cell in the cell cluster, the first part of system information that needs to be used by the target cell and that is sent by the target cell.

With reference to the third possible implementation of the first aspect of the embodiments of the present invention, in a fourth possible implementation of the first aspect of the embodiments of the present invention, the first part of system information needing to be used by the target cell is obtained by the target cell by deducting, after the target cell receives the second part of system information sent by the primary cell, the second part of system information from the system information needing to be used by the target cell.

With reference to the second possible implementation of the first aspect of the embodiments of the present invention, in a fifth possible implementation of the first aspect of the embodiments of the present invention, the obtaining, by the mobile device after entering a coverage area of any target cell in the cell cluster, the first part of system information needing to be used by the target cell includes:

sending, by the mobile device, a system information request to the primary cell after entering the coverage area of any target cell in the cell cluster; and receiving, by the mobile device, the first part of system information that needs to be used by the target cell and that is sent by the primary cell in response to the system information request.

With reference to the fifth possible implementation of the first aspect of the embodiments of the present invention, in a sixth possible implementation of the first aspect of the embodiments of the present invention, the first part of system information needing to be used by the target cell is obtained by the target cell by deducting, after the target cell receives the second part of system information sent by the primary cell, the second part of system information from the system information needing to be used by the target cell, and is sent to the primary cell.

With reference to the second possible implementation of the first aspect of the embodiments of the present invention, in a seventh possible implementation of the first aspect of the embodiments of the present invention, the obtaining, by the mobile device after entering a coverage area of any target cell in the cell cluster, the first part of system information needing to be used by the target cell includes:

receiving, by the mobile device after entering the coverage area of any target cell in the cell cluster, the first part of system information that needs to be used by the target cell and that is sent by the primary cell according to location information of the mobile device.

With reference to the seventh possible implementation of the first aspect of the embodiments of the present invention, in an eighth possible implementation of the first aspect of the embodiments of the present invention, the first part of system information needing to be used by the target cell is obtained by the target cell by deducting, after the target cell receives the second part of system information sent by the primary cell, the second part of system information from the system information needing to be used by the target cell, and is sent to the primary cell.

A second aspect of the embodiments of the present invention discloses a system information obtaining method in a cell cluster, including:

obtaining, by a mobile device, an index number corresponding to system information needing to be used by any target cell in the cell cluster; and obtaining, by the mobile device from at least one set of system information prestored in the mobile device based on the index number, the system information needing to be used by the target cell, where the system information needing to be used by the target cell has the index number.

In a first possible implementation of the second aspect of the embodiments of the present invention, the method further includes:

receiving and storing, by the mobile device, the at least one set of system information sent by a primary cell, where each set of the system information has a corresponding index number, the cell cluster is in a coverage area of the primary cell, and each set of the system information corresponds to one micro cell in the cell cluster.

With reference to the first possible implementation of the second aspect of the embodiments of the present invention, in a second possible implementation of the second aspect of the embodiments of the present invention, the obtaining, by a mobile device, an index number corresponding to system information needing to be used by any target cell in the cell cluster includes:

obtaining, by the mobile device after entering a coverage area of any target cell in the cell cluster, the index number corresponding to the system information needing to be used by the target cell.

With reference to the second possible implementation of the second aspect of the embodiments of the present invention, in a third possible implementation of the second aspect of the embodiments of the present invention, the obtaining, by the mobile device after entering a coverage area of any target cell in the cell cluster, the index number corresponding to the system information needing to be used by the target cell includes:

receiving, by the mobile device after entering the coverage area of any target cell in the cell cluster, the index number that corresponds to the system information needing to be used by the target cell and that is sent by the target cell on an air interface.

With reference to the third possible implementation of the second aspect of the embodiments of the present invention, in a fourth possible implementation of the second aspect of the embodiments of the present invention, the receiving, by the mobile device after entering the coverage area of any target cell in the cell cluster, the index number that corresponds to the system information needing to be used by the target cell and that is sent by the target cell on an air interface includes:

after entering the coverage area of any target micro cell in the cell cluster, receiving, by the mobile device, a first indication message sent by the primary cell, where the first indication message is used to instruct to start index number receiving; and receiving, by the mobile device in response to the first indication message, the index number that corresponds to the system information needing to be used by the target cell and that is sent by the target cell on the air interface.

With reference to any one of the first to the fourth possible implementations of the second aspect of the embodiments of the present invention, in a fifth possible implementation of the second aspect of the embodiments of the present invention, the index number corresponding to the system information needing to be used by the target cell is sent by the target cell after the target cell receives a second indication message sent by the primary cell, where the second indication message is sent by the primary cell to the target cell after the primary cell detects that the mobile device enters the coverage area of the target cell, and the second indication message is used to instruct to start index number sending.

A third aspect of the embodiments of the present invention discloses a system information obtaining method in a cell cluster, including:

receiving, by a mobile device, a notification message sent by a primary cell, where the notification message is used to instruct the mobile device to request system information from any target cell in the cell cluster, and the cell cluster is in a coverage area of the primary cell;

sending, by the mobile device, a system information obtaining request to the target cell in response to the notification message; and receiving, by the mobile device, the system information sent by the target cell.

A fourth aspect of the embodiments of the present invention discloses a system information obtaining method in a cell cluster, including:

receiving a system information request that is sent by a mobile device for any target cell in the cell cluster; and sending a first part of system information needing to be used by the target cell to the mobile device in response to the system information request, so that the mobile device combines the first part of system information and a second part of system information that is prestored in the mobile device, to obtain system information needing to be used by the target cell; or the mobile device replaces a part that is in prestored designated system information and that corresponds to the first part of system information with the first part of system information, and uses updated designated system information as system information needing to be used by the target cell.

In a first possible implementation of the fourth aspect of the embodiments of the present invention, the method further includes:

sending the second part of system information to the mobile device, where the second part of system information is a same part of system information needing to be used by all cells in the cell cluster; or sending the designated system information to the mobile device, where the designated system information includes the second part of system information and the part that corresponds to the first part of system information and that needs to be used by all cells in the cell cluster.

A fifth aspect of the embodiments of the present invention discloses a system information obtaining method in a cell cluster, including:

receiving a system information obtaining request sent by a mobile device, where the system information obtaining request is sent by the mobile device in response after the mobile device receives a notification message sent by a primary cell, the notification message is used to instruct the mobile device to request system information from any target cell in the cell cluster, and the cell cluster is in a coverage area of the primary cell; and sending the system information of the target cell to the mobile device in response to the system information obtaining request.

A sixth aspect of the embodiments of the present invention discloses a mobile device, configured to execute a system information obtaining method in a cell cluster, and including:

an obtaining unit, configured to obtain a first part of system information needing to be used by any target cell in the cell cluster; and a processing unit, configured to combine the first part of system information and a second part of system information that is prestored in the mobile device, to obtain system information needing to be used by the target cell, or the processing unit, configured to: replace a part that is in prestored designated system information and that corresponds to the first part of system information with the first part of system information, and use updated designated system information as system information needing to be used by the target cell.

In a first possible implementation of the sixth aspect of the embodiments of the present invention, the mobile device further includes:

a receiving unit, configured to receive the second part of system information sent by a primary cell, where the cell cluster is in a coverage area of the primary cell, and the second part of system information is a same part of system information needing to be used by all cells in the cell cluster; and a storage unit, configured to store the second part of system information; or the receiving unit, configured to receive the designated system information sent by a primary cell, where the designated system information includes the second part of system information and the part that corresponds to the first part of system information and that needs to be used by all cells in the cell cluster; and the storage unit, configured to store the designated system information.

With reference to the first possible implementation of the sixth aspect of the embodiments of the present invention, in a second possible implementation of the sixth aspect of the embodiments of the present invention, the obtaining unit is specifically configured to: after the mobile device enters a coverage area of any target cell in the cell cluster, obtain the first part of system information needing to be used by the target cell.

With reference to the second possible implementation of the sixth aspect of the embodiments of the present invention, in a third possible implementation of the sixth aspect of the embodiments of the present invention, the obtaining unit is specifically configured to: after the mobile device enters the coverage area of any target cell in the cell cluster, receive the first part of system information that needs to be used by the target cell and that is sent by the target cell.

With reference to the third possible implementation of the sixth aspect of the embodiments of the present invention, in a fourth possible implementation of the sixth aspect of the embodiments of the present invention, the first part of system information needing to be used by the target cell is obtained by the target cell by deducting, after the target cell receives the second part of system information sent by the primary cell, the second part of system information from the system information needing to be used by the target cell.

With reference to the first possible implementation of the sixth aspect of the embodiments of the present invention, in a fifth possible implementation of the sixth aspect of the embodiments of the present invention, the obtaining unit is specifically configured to: after the mobile device enters the coverage area of any target cell in the cell cluster, send a system information request to the primary cell, and receive the first part of system information that needs to be used by the target cell and that is sent by the primary cell in response to the system information request.

With reference to the fifth possible implementation of the sixth aspect of the embodiments of the present invention, in a sixth possible implementation of the sixth aspect of the embodiments of the present invention, the first part of system information needing to be used by the target cell is obtained by the target cell by deducting, after the target cell receives the second part of system information sent by the primary cell, the second part of system information from the system information needing to be used by the target cell, and is sent to the primary cell.

With reference to the first possible implementation of the sixth aspect of the embodiments of the present invention, in a seventh possible implementation of the sixth aspect of the embodiments of the present invention, the obtaining unit is specifically configured to: after the mobile device enters the coverage area of any target cell in the cell cluster, receive the first part of system information that needs to be used by the target cell and that is sent by the primary cell according to location information of the mobile device.

With reference to the seventh possible implementation of the sixth aspect of the embodiments of the present invention, in an eighth possible implementation of the sixth aspect of the embodiments of the present invention, the first part of system information needing to be used by the target cell is obtained by the target cell by deducting, after the target cell receives the second part of system information sent by the primary cell, the second part of system information from the system information needing to be used by the target cell, and is sent to the primary cell.

A seventh aspect of the embodiments of the present invention discloses a mobile device, configured to execute a system information obtaining method in a cell cluster, and including:

a first obtaining unit, configured to obtain an index number corresponding to system information needing to be used by any target cell in the cell cluster; and a second obtaining unit, configured to obtain, from at least one set of system information prestored in the mobile device based on the index number, the system information needing to be used by the target cell, where the system information needing to be used by the target cell has the index number.

In a first possible implementation of the seventh aspect of the embodiments of the present invention, the mobile device further includes:

a receiving unit, configured to receive the at least one set of system information sent by a primary cell, where each set of the system information has a corresponding index number, the cell cluster is in a coverage area of the primary cell, and each set of the system information corresponds to one cell in the cell cluster; and a storage unit, configured to store the at least one set of system information.

With reference to the first possible implementation of the seventh aspect of the embodiments of the present invention, in a second possible implementation of the seventh aspect of the embodiments of the present invention, the first obtaining unit is specifically configured to: after the mobile device enters a coverage area of any target cell in the cell cluster, obtain the index number corresponding to the system information needing to be used by the target cell.

With reference to the second possible implementation of the seventh aspect of the embodiments of the present invention, in a third possible implementation of the seventh aspect of the embodiments of the present invention, the first obtaining unit is specifically configured to: after the mobile device enters the coverage area of any target cell in the cell cluster, receive the index number that corresponds to the system information needing to be used by the target cell and that is sent by the target cell on an air interface.

With reference to the third possible implementation of the seventh aspect of the embodiments of the present invention, in a fourth possible implementation of the seventh aspect of the embodiments of the present invention, the first obtaining unit is specifically configured to: after the mobile device enters the coverage area of any target cell in the cell cluster, receive a first indication message sent by the primary cell, where the first indication message is used to instruct to start index number receiving; and receive, in response to the first indication message, the index number that corresponds to the system information needing to be used by the target cell and that is sent by the target cell on the air interface.

With reference to any one of the first to the fourth possible implementations of the seventh aspect of the embodiments of the present invention, in a fifth possible implementation of the seventh aspect of the embodiments of the present invention, the index number corresponding to the system information needing to be used by the target cell is sent by the target cell after the target cell receives a second indication message sent by the primary cell, where the second indication message is sent by the primary cell to the target cell after the primary cell detects that the mobile device enters the coverage area of the target cell, and the second indication message is used to instruct to start index number sending.

An eighth aspect of the embodiments of the present invention discloses a mobile device, configured to execute a system information obtaining method in a cell cluster, and including:

a receiving unit, configured to receive a notification message sent by a primary cell, where the notification message is used to instruct the mobile device to request system information from any target cell in the cell cluster, and the cell cluster is in a coverage area of the primary cell; and a sending unit, configured to send a system information obtaining request to the target cell in response to the notification message, where the receiving unit is further configured to receive the system information sent by the target cell.

A ninth aspect of the embodiments of the present invention discloses a mobile device, configured to execute a system information obtaining method in a cell cluster, and including: at least one processor, a network interface, and a memory, where the at least one processor, the network interface, and the memory are interconnected by using a bus system in the mobile device, the memory is configured to store a program and information, and the processor is configured to invoke the program stored in the memory, to perform the following operations:

obtaining, by using the network interface, a first part of system information needing to be used by any target cell in the cell cluster; and combining the first part of system information and a second part of system information that is prestored in the memory, to obtain system information needing to be used by the target cell, or replacing a part that is in designated system information prestored in the memory and that corresponds to the first part of system information with the first part of system information, and using updated designated system information as system information needing to be used by the target cell.

In a first possible implementation of the ninth aspect of the embodiments of the present invention, the processor is further configured to invoke the program stored in the memory, to perform the following operations:

receiving, by using the network interface, the second part of system information sent by a primary cell, and storing the second part of system information into the memory, where the cell cluster is in a coverage area of the primary cell, and the second part of system information is a same part of system information needing to be used by all cells in the cell cluster; or receiving, by using the network interface, the designated system information sent by a primary cell, and storing the designated system information into the memory, where the designated system information includes the second part of system information and the part that corresponds to the first part of system information and that needs to be used by all cells in the cell cluster.

With reference to the first possible implementation of the ninth aspect of the embodiments of the present invention, in a second possible implementation of the ninth aspect of the embodiments of the present invention, a manner of obtaining, by the processor by using the network interface, the first part of system information needing to be used by any target cell in the cell cluster is specifically:

obtaining, by the processor by using the network interface after the mobile device enters a coverage area of any target cell in the cell cluster, the first part of system information needing to be used by the target cell.

With reference to the second possible implementation of the ninth aspect of the embodiments of the present invention, in a third possible implementation of the ninth aspect of the embodiments of the present invention, a manner of obtaining, by the processor by using the network interface after the mobile device enters the coverage area of any target cell in the cell cluster, the first part of system information needing to be used by the target cell is specifically:

receiving, by using the network interface after the mobile device enters the coverage area of any target cell in the cell cluster, the first part of system information that needs to be used by the target cell and that is sent by the target cell.

With reference to the third possible implementation of the ninth aspect of the embodiments of the present invention, in a fourth possible implementation of the ninth aspect of the embodiments of the present invention, the first part of system information needing to be used by the target cell is obtained by the target cell by deducting, after the target cell receives the second part of system information sent by the primary cell, the second part of system information from the system information needing to be used by the target cell.

With reference to the first possible implementation of the ninth aspect of the embodiments of the present invention, in a fifth possible implementation of the ninth aspect of the embodiments of the present invention, a manner of obtaining, by the processor by using the network interface after the mobile device enters the coverage area of any target cell in the cell cluster, the first part of system information needing to be used by the target cell is specifically:

sending, by using the network interface, a system information request to the primary cell after the mobile device enters the coverage area of any target cell in the cell cluster; and receiving, by using the network interface, the first part of system information that needs to be used by the target cell and that is sent by the primary cell in response to the system information request.

With reference to the fifth possible implementation of the ninth aspect of the embodiments of the present invention, in a sixth possible implementation of the ninth aspect of the embodiments of the present invention, the first part of system information needing to be used by the target cell is obtained by the target cell by deducting, after the target cell receives the second part of system information sent by the primary cell, the second part of system information from the system information needing to be used by the target cell, and is sent to the primary cell.

With reference to the first possible implementation of the ninth aspect of the embodiments of the present invention, in a seventh possible implementation of the ninth aspect of the embodiments of the present invention, a manner of obtaining, by the processor by using the network interface after the mobile device enters the coverage area of any target cell in the cell cluster, the first part of system information needing to be used by the target cell is specifically:

receiving, by using the network interface after the mobile device enters the coverage area of any target cell in the cell cluster, the first part of system information that needs to be used by the target cell and that is sent by the primary cell according to location information of the mobile device.

With reference to the seventh possible implementation of the ninth aspect of the embodiments of the present invention, in an eighth possible implementation of the ninth aspect of the embodiments of the present invention, the first part of system information needing to be used by the target cell is obtained by the target cell by deducting, after the target cell receives the second part of system information sent by the primary cell, the second part of system information from the system information needing to be used by the target cell, and is sent to the primary cell.

A tenth aspect of the embodiments of the present invention discloses a mobile device, configured to execute a system information obtaining method in a cell cluster, and including: at least one processor, a network interface, and a memory, where the at least one processor, the network interface, and the memory are interconnected by using a bus system in the mobile device, the memory is configured to store a program and information, and the processor is configured to invoke the program stored in the memory, to perform the following operations:

obtaining, by using the network interface, an index number corresponding to system information needing to be used by any target cell in the cell cluster; and obtaining, from at least one set of system information prestored in the memory based on the index number, the system information needing to be used by the target cell, where the system information needing to be used by the target cell has the index number.

In a first possible implementation of the tenth aspect of the embodiments of the present invention, the processor is further configured to invoke the program stored in the memory, to perform the following operations:

receiving, by using the network interface, the at least one set of system information sent by a primary cell, and storing the at least one set of system information into the memory, where each set of the system information has a corresponding index number, the cell cluster is in a coverage area of the primary cell, and each set of the system information corresponds to one cell in the cell cluster.

With reference to the first possible implementation of the tenth aspect of the embodiments of the present invention, in a second possible implementation of the tenth aspect of the embodiments of the present invention, a manner of obtaining, by the processor by using the network interface, the index number corresponding to the system information needing to be used by any target cell in the cell cluster is specifically:

obtaining, by using the network interface after the mobile device enters a coverage area of any target cell in the cell cluster, the index number corresponding to the system information needing to be used by the target cell.

With reference to the second possible implementation of the tenth aspect of the embodiments of the present invention, in a third possible implementation of the tenth aspect of the embodiments of the present invention, a manner of obtaining, by the processor by using the network interface after the mobile device enters the coverage area of any target cell in the cell cluster, the index number corresponding to the system information needing to be used by the target cell is specifically:

receiving, by using the network interface after the mobile device enters the coverage area of any target cell in the cell cluster, the index number that corresponds to the system information needing to be used by the target cell and that is sent by the target cell on an air interface.

With reference to the third possible implementation of the tenth aspect of the embodiments of the present invention, in a fourth possible implementation of the tenth aspect of the embodiments of the present invention, a manner of receiving, by the processor by using the network interface after the mobile device enters the coverage area of any target cell in the cell cluster, the index number that corresponds to the system information needing to be used by the target cell and that is sent by the target cell on the air interface is specifically:

after the mobile device enters the coverage area of any target cell in the cell cluster, receiving, by using the network interface, a first indication message sent by the primary cell, where the first indication message is used to instruct to start index number receiving; and receiving, by using the network interface in response to the first indication message, the index number that corresponds to the system information needing to be used by the target cell and that is sent by the target cell on the air interface.

With reference to any one of the first to the fourth possible implementations of the tenth aspect of the embodiments of the present invention, in a fifth possible implementation of the tenth aspect of the embodiments of the present invention, the index number corresponding to the system information needing to be used by the target cell is sent by the target cell after the target cell receives a second indication message sent by the primary cell, where the second indication message is sent by the primary cell to the target cell after the primary cell detects that the mobile device enters the coverage area of the target cell, and the second indication message is used to instruct to start index number sending.

An eleventh aspect of the embodiments of the present invention discloses a mobile device, configured to execute a system information obtaining method in a cell cluster, and including: at least one processor, a network interface, and a memory, where the at least one processor, the network interface, and the memory are interconnected by using a bus system in the mobile device, the memory is configured to store a program and information, and the processor is configured to invoke the program stored in the memory, to perform the following operations:

receiving, by using the network interface, a notification message sent by a primary cell, where the notification message is used to instruct the mobile device to request system information from any target cell in the cell cluster, and the cell cluster is in a coverage area of the primary cell;

sending, by using the network interface, a system information obtaining request to the target cell in response to the notification message; and receiving, by using the network interface, the system information sent by the target cell.

A twelfth aspect of the embodiments of the present invention discloses a chip module, built in a mobile device, configured to execute a system information obtaining method in a cell cluster, and including: a processor part, a network interface part, and a memory part, where the processor part, the network interface part, and the memory part are interconnected by using a bus system in the chip module, the memory part is configured to store a program and information, and the processor part is configured to invoke the program stored in the memory part, to perform the following operations:

obtaining, by using the network interface part, a first part of system information needing to be used by any target cell in the cell cluster; and combining the first part of system information and a second part of system information that is prestored in the memory part, to obtain system information needing to be used by the target cell, or replacing a part that is in designated system information prestored in the memory part and that corresponds to the first part of system information with the first part of system information, and using updated designated system information prestored in the memory part as system information needing to be used by the target cell.

In a first possible implementation of the twelfth aspect of the embodiments of the present invention, the processor part is further configured to invoke the program stored in the memory part, to perform the following operations:

receiving, by using the network interface part, the second part of system information sent by a primary cell, and storing the second part of system information into the memory part, where the cell cluster is in a coverage area of the primary cell, and the second part of system information is a same part of system information needing to be used by all cells in the cell cluster; or receiving, by using the network interface part, the designated system information sent by a primary cell, and storing the designated system information into the memory part, where the designated system information includes the second part of system information and the part that corresponds to the first part of system information and that needs to be used by all cells in the cell cluster.

With reference to the first possible implementation of the twelfth aspect of the embodiments of the present invention, in a second possible implementation of the twelfth aspect of the embodiments of the present invention, a manner of obtaining, by the processor part by using the network interface part, the first part of system information needing to be used by any target cell in the cell cluster is specifically:

obtaining, by the processor part by using the network interface part after the mobile device enters a coverage area of any target cell in the cell cluster, the first part of system information needing to be used by the target cell.

With reference to the second possible implementation of the twelfth aspect of the embodiments of the present invention, in a third possible implementation of the twelfth aspect of the embodiments of the present invention, a manner of obtaining, by the processor part by using the network interface part after the mobile device enters the coverage area of any target cell in the cell cluster, the first part of system information needing to be used by the target cell is specifically:

receiving, by using the network interface part after the mobile device enters the coverage area of any target cell in the cell cluster, the first part of system information that needs to be used by the target cell and that is sent by the target cell.

With reference to the third possible implementation of the twelfth aspect of the embodiments of the present invention, in a fourth possible implementation of the twelfth aspect of the embodiments of the present invention, the first part of system information needing to be used by the target cell is obtained by the target cell by deducting, after the target cell receives the second part of system information sent by the primary cell, the second part of system information from the system information needing to be used by the target cell.

With reference to the first possible implementation of the twelfth aspect of the embodiments of the present invention, in a fifth possible implementation of the twelfth aspect of the embodiments of the present invention, a manner of obtaining, by the processor part by using the network interface part after the mobile device enters the coverage area of any target cell in the cell cluster, the first part of system information needing to be used by the target cell is specifically:

sending, by using the network interface part, a system information request to the primary cell after the mobile device enters the coverage area of any target cell in the cell cluster; and receiving, by using the network interface part, the first part of system information that needs to be used by the target cell and that is sent by the primary cell in response to the system information request.

With reference to the fifth possible implementation of the twelfth aspect of the embodiments of the present invention, in a sixth possible implementation of the twelfth aspect of the embodiments of the present invention, the first part of system information needing to be used by the target cell is obtained by the target cell by deducting, after the target cell receives the second part of system information sent by the primary cell, the second part of system information from the system information needing to be used by the target cell, and is sent to the primary cell.

With reference to the first possible implementation of the twelfth aspect of the embodiments of the present invention, in a seventh possible implementation of the twelfth aspect of the embodiments of the present invention, a manner of obtaining, by the processor part by using the network interface part after the mobile device enters the coverage area of any target cell in the cell cluster, the first part of system information needing to be used by the target cell is specifically:

receiving, by using the network interface part after the mobile device enters the coverage area of any target cell in the cell cluster, the first part of system information that needs to be used by the target cell and that is sent by the primary cell according to location information of the mobile device.

With reference to the seventh possible implementation of the twelfth aspect of the embodiments of the present invention, in an eighth possible implementation of the twelfth aspect of the embodiments of the present invention, the first part of system information needing to be used by the target cell is obtained by the target cell by deducting, after the target cell receives the second part of system information sent by the primary cell, the second part of system information from the system information needing to be used by the target cell, and is sent to the primary cell.

A thirteenth aspect of the embodiments of the present invention discloses a chip module, built in a mobile device, configured to execute a system information obtaining method in a cell cluster, and including: a processor part, a network interface part, and a memory part, where the processor part, the network interface part, and the memory part are interconnected by using a bus system in the chip module, the memory part is configured to store a program and information, and the processor part is configured to invoke the program stored in the memory part, to perform the following operations:

obtaining, by using the network interface part, an index number corresponding to system information needing to be used by any target cell in the cell cluster; and obtaining, from at least one set of system information prestored in the memory part based on the index number, the system information needing to be used by the target cell, where the system information needing to be used by the target cell has the index number.

In a first possible implementation of the thirteenth aspect of the embodiments of the present invention, the processor part is further configured to invoke the program stored in the memory part, to perform the following operations:

receiving, by using the network interface part, the at least one set of system information sent by a primary cell, and storing the at least one set of system information into the memory part, where each set of the system information has a corresponding index number, the cell cluster is in a coverage area of the primary cell, and each set of the system information corresponds to one cell in the cell cluster.

With reference to the first possible implementation of the thirteenth aspect of the embodiments of the present invention, in a second possible implementation of the thirteenth aspect of the embodiments of the present invention, a manner of obtaining, by the processor part by using the network interface part, the index number corresponding to the system information needing to be used by any target cell in the cell cluster is specifically:

obtaining, by using the network interface part after the mobile device enters a coverage area of any target cell in the cell cluster, the index number corresponding to the system information needing to be used by the target cell.

With reference to the second possible implementation of the thirteenth aspect of the embodiments of the present invention, in a third possible implementation of the thirteenth aspect of the embodiments of the present invention, a manner of obtaining, by the processor part by using the network interface part after the mobile device enters the coverage area of any target cell in the cell cluster, the index number corresponding to the system information needing to be used by the target cell is specifically:

receiving, by using the network interface part after the mobile device enters the coverage area of any target cell in the cell cluster, the index number that corresponds to the system information needing to be used by the target cell and that is sent by the target cell on an air interface.

With reference to the third possible implementation of the thirteenth aspect of the embodiments of the present invention, in a fourth possible implementation of the thirteenth aspect of the embodiments of the present invention, a manner of receiving, by the processor part by using the network interface part after the mobile device enters the coverage area of any target cell in the cell cluster, the index number that corresponds to the system information needing to be used by the target cell and that is sent by the target cell on the air interface is specifically:

after the mobile device enters the coverage area of any target cell in the cell cluster, receiving, by using the network interface part, a first indication message sent by the primary cell, where the first indication message is used to instruct to start index number receiving; and receiving, by using the network interface part in response to the first indication message, the index number that corresponds to the system information needing to be used by the target cell and that is sent by the target cell on the air interface.

With reference to any one of the first to the fourth possible implementations of the thirteenth aspect of the embodiments of the present invention, in a fifth possible implementation of the thirteenth aspect of the embodiments of the present invention, the index number corresponding to the system information needing to be used by the target cell is sent by the target cell after the target cell receives a second indication message sent by the primary cell, where the second indication message is sent by the primary cell to the target cell after the primary cell detects that the mobile device enters the coverage area of the target cell, and the second indication message is used to instruct to start index number sending.

A fourteenth aspect of the embodiments of the present invention discloses a chip module, built in a mobile device, configured to execute a system information obtaining method in a cell cluster, and including: a processor part, a network interface part, and a memory part, where the processor part, the network interface part, and the memory part are interconnected by using a bus system in the chip module, the memory part is configured to store a program and information, and the processor part is configured to invoke the program stored in the memory part, to perform the following operations:

receiving, by using the network interface part, a notification message sent by a primary cell, where the notification message is used to instruct the mobile device to request system information from any target cell in the cell cluster, and the cell cluster is in a coverage area of the primary cell;

sending, by using the network interface part, a system information obtaining request to the target cell in response to the notification message; and receiving, by using the network interface part, the system information sent by the target cell.

A fifteenth aspect of the embodiments of the present invention discloses a base station device, configured to execute a system information obtaining method in a cell cluster, and including:

a receiving unit, configured to receive a system information request that is sent by a mobile device for any target cell in the cell cluster; and a sending unit, configured to send a first part of system information needing to be used by the target cell to the mobile device in response to the system information request, so that the mobile device combines the first part of system information and a second part of system information that is prestored in the mobile device, to obtain system information needing to be used by the target cell; or the mobile device replaces a part that is in prestored designated system information and that corresponds to the first part of system information with the first part of system information, and uses updated designated system information as system information needing to be used by the target cell.

In a first possible implementation of the fifteenth aspect of the embodiments of the present invention, the sending unit is further configured to send the second part of system information to the mobile device, where the second part of system information is a same part of system information needing to be used by all cells in the cell cluster; or the sending unit is further configured to send the designated system information to the mobile device, where the designated system information includes the second part of system information and the part that corresponds to the first part of system information and that needs to be used by all cells in the cell cluster.

A sixteenth aspect of the embodiments of the present invention discloses a base station device, configured to execute a system information obtaining method in a cell cluster, and including:

a receiving unit, configured to receive a system information obtaining request sent by a mobile device, where the system information obtaining request is sent by the mobile device in response after the mobile device receives a notification message sent by a primary cell, the notification message is used to instruct the mobile device to request system information from any target cell in the cell cluster, and the cell cluster is in a coverage area of the primary cell; and a sending unit, configured to send the system information of the target cell to the mobile device in response to the system information obtaining request.

A seventeenth aspect of the embodiments of the present invention discloses a base station device, configured to execute a system information obtaining method in a cell cluster, and including: at least one processor, a network interface, and a memory, where the at least one processor, the network interface, and the memory are interconnected by using a bus system in the base station device, the memory is configured to store a program and information, and the processor is configured to invoke the program stored in the memory, to perform the following operations:

receiving, by using the network interface, a system information request that is sent by a mobile device for any target cell in the cell cluster; and sending, by using the network interface, a first part of system information needing to be used by the target cell to the mobile device in response to the system information request, so that the mobile device combines the first part of system information and a second part of system information that is prestored in the mobile device, to obtain system information needing to be used by the target cell; or the mobile device replaces a part that is in prestored designated system information and that corresponds to the first part of system information with the first part of system information, and uses updated designated system information as system information needing to be used by the target cell.

In a first possible implementation of the seventeenth aspect of the embodiments of the present invention, the processor is further configured to invoke the program stored in the memory, to perform the following operations:

sending, by using the network interface, the second part of system information prestored in the memory to the mobile device, where the second part of system information is a same part of system information needing to be used by all cells in the cell cluster; or sending, by using the network interface, the designated system information prestored in the memory to the mobile device, where the designated system information includes the second part of system information and the part that corresponds to the first part of system information and that needs to be used by all cells in the cell cluster.

An eighteenth aspect of the embodiments of the present invention discloses a base station device, configured to execute a system information obtaining method in a cell cluster, and including: at least one processor, a network interface, and a memory, where the at least one processor, the network interface, and the memory are interconnected by using a bus system in the base station device, the memory is configured to store a program and information, and the processor is configured to invoke the program stored in the memory, to perform the following operations:

receiving, by using the network interface, a system information obtaining request sent by a mobile device, where the system information obtaining request is sent by the mobile device in response after the mobile device receives a notification message sent by a primary cell, the notification message is used to instruct the mobile device to request system information from any target cell in the cell cluster, and the cell cluster is in a coverage area of the primary cell; and sending, by using the network interface, the system information of the target cell prestored in the memory to the mobile device in response to the system information obtaining request.

A nineteenth aspect of the embodiments of the present invention discloses a chip module, built in a base station device, configured to execute a system information obtaining method in a cell cluster, and including: a processor part, a network interface part, and a memory part, where the processor part, the network interface part, and the memory part are interconnected by using a bus system in the chip module, the memory part is configured to store a program and information, and the processor part is configured to invoke the program stored in the memory part, to perform the following operations:

receiving, by using the network interface part, a system information request that is sent by a mobile device for any target cell in the cell cluster; and sending, by using the network interface part, a first part of system information needing to be used by the target cell to the mobile device in response to the system information request, so that the mobile device combines the first part of system information and a second part of system information that is prestored in the mobile device, to obtain system information needing to be used by the target cell; or the mobile device replaces a part that is in prestored designated system information and that corresponds to the first part of system information with the first part of system information, and uses updated designated system information as system information needing to be used by the target cell.

In a first possible implementation of the nineteenth aspect of the embodiments of the present invention, the processor part is further configured to invoke the program stored in the memory part, to perform the following operations:

sending, by using the network interface part, the second part of system information prestored in the memory part to the mobile device, where the second part of system information is a same part of system information needing to be used by all cells in the cell cluster; or sending, by using the network interface part, the designated system information prestored in the memory part to the mobile device, where the designated system information includes the second part of system information and the part that corresponds to the first part of system information and that needs to be used by all cells in the cell cluster.

A twentieth aspect of the embodiments of the present invention discloses a chip module, built in a base station device, configured to execute a system information obtaining method in a cell cluster, and including: a processor part, a network interface part, and a memory part, where the processor part, the network interface part, and the memory part are interconnected by using a bus system in the chip module, the memory part is configured to store a program and information, and the processor part is configured to invoke the program stored in the memory part, to perform the following operations:

receiving, by using the network interface part, a system information obtaining request sent by a mobile device, where the system information obtaining request is sent by the mobile device in response after the mobile device receives a notification message sent by a primary cell, the notification message is used to instruct the mobile device to request system information from any target cell in the cell cluster, and the cell cluster is in a coverage area of the primary cell; and sending, by using the network interface part, the system information of the target cell prestored in the memory part to the mobile device in response to the system information obtaining request.

A twenty-first aspect of the embodiments of the present invention discloses a system information obtaining system in a cell cluster, including a mobile device and a base station device, where the mobile device is configured to send a system information request for any target cell in the cell cluster to the base station device;

the base station device is configured to: receive the system information request sent by the mobile device, and send a first part of system information needing to be used by the target cell to the mobile device in response to the system information request; and the mobile device is further configured to: receive the first part of system information that needs to be used by the target cell and that is sent by the base station device; and combine the first part of system information and a second part of system information that is prestored in the mobile device, to obtain system information needing to be used by the target cell; or replace a part that is in prestored designated system information and that corresponds to the first part of system information with the first part of system information, and use updated designated system information as system information needing to be used by the target cell.

In a first possible implementation of the twenty-first aspect of the embodiments of the present invention, the base station device is further configured to send the second part of system information to the mobile device, where the second part of system information is a same part of system information needing to be used by all cells in the cell cluster; or send the designated system information to the mobile device, where the designated system information includes the second part of system information and the part that corresponds to the first part of system information and that needs to be used by all cells in the cell cluster.

With reference to the first or the second possible implementation of the twenty-first aspect of the embodiments of the present invention, in a third possible implementation of the twenty-first aspect of the embodiments of the present invention, the base station device is a base station device of a primary cell and is in a coverage area of the primary cell in the cell cluster.

A twenty-second aspect of the embodiments of the present invention discloses a system information obtaining system in a cell cluster, including a mobile device and a base station device, where the mobile device is configured to: receive a notification message sent by a primary cell, and send a system information obtaining request to the base station device in response to the notification message, where the notification message is used to instruct the mobile device to request system information from any target cell in the cell cluster, and the cell cluster is in a coverage area of the primary cell; and the base station device is configured to: receive the system information obtaining request sent by the mobile device, and send system information of the target cell to the mobile device in response to the system information obtaining request.

With reference to the first possible implementation of the twenty-second aspect of the embodiments of the present invention, in a second possible implementation of the twenty-second aspect of the embodiments of the present invention, the base station device is a base station device of the target cell.

Compared with the prior art, the embodiments of the present invention have the following beneficial effects:

In the embodiments of the present invention, because a first part of system information needing to be used by a target cell is merely a part in comparison with entire system information needing to be used by the target cell, a mobile device consumes relatively little power and time to obtain the first part of system information needing to be used by the target cell. In this way, after the mobile device combines the first part of system information and a second part of prestored system information, or replaces a part that is in prestored designated system information and that corresponds to the first part of system information with the first part of system information, the entire system information used by the target cell can be obtained by using relatively little power and time, so that efficiency of obtaining, by the mobile device, entire system information can be improved, and power consumption of the mobile device can be reduced.

In the embodiments of the present invention, because an index number corresponding to system information needing to be used by a target cell has an extremely small amount of information in comparison with the system information needing to be used by the target cell, a mobile device consumes extremely little power and time to obtain the index number corresponding to the system information needing to be used by the target cell. In this way, by using extremely little power and time, the system information needing to be used by the target cell can be obtained from at least one set of prestored system information based on the index number, thereby improving efficiency of obtaining, by the mobile device, entire system information and reducing power consumption of the mobile device.

In the embodiments of the present invention, a mobile device requests system information from any target cell in a cell cluster in response to the notification message only after receiving a notification message sent by a primary cell, and the mobile device does not need to periodically read entire system information broadcast by each cell, thereby reducing power consumption of the mobile device.

In the embodiments of the present invention, a target cell sends system information to a mobile device only when receiving a system information obtaining request sent by the mobile device. That is, if the mobile device does not send the system information request, the target cell does not send the system information. Compared with that a cell periodically broadcasts system information, the embodiments of the present invention can effectively reduce power consumption of a network side device.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention disclose a system information obtaining method in a cell cluster, and a related device, to improve efficiency of obtaining system information and reduce power consumption of a mobile device. The cell cluster in the embodiments of the present invention may include a cell cluster (also referred to as a micro cell cluster) exclusively including micro cells, or a cell cluster (also referred to as a macro cell cluster) exclusively including primary cells (for example, macro cells), or a cell cluster (also referred to as a hybrid cell cluster) including a primary cell (for example, a macro cell) and a micro cell. This is not limited in the embodiments of the present invention. Particularly, in the embodiments of the present invention, when the cell cluster exclusively includes micro cells, the cell cluster may also be in a coverage area of a primary cell (for example, a macro cell). That is, in this case, the primary cell (for example, the macro cell) may configure each micro cell (that is, pico) in the cell cluster into a secondary serving cell of a mobile terminal. Detailed descriptions are separately provided below.

Figure 1:
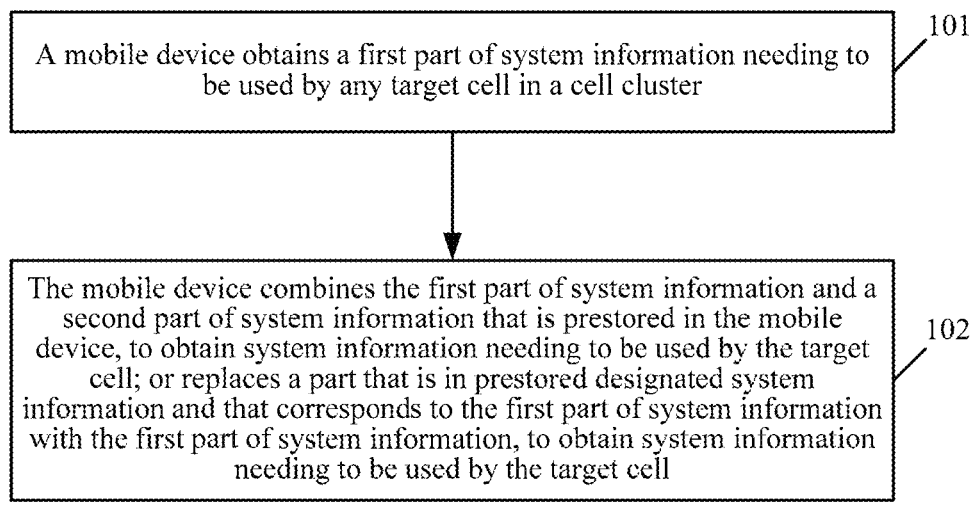
FIG. 1 is a schematic flowchart of a system information obtaining method in a cell cluster according to an embodiment of the present invention.

Referring to FIG. 1, FIG. 1 is a schematic flowchart of a system information obtaining method in a cell cluster according to an embodiment of the present invention. As shown in FIG. 1, the method may include the following steps.

101. A mobile device obtains a first part of system information needing to be used by any target cell in the cell cluster.

In this embodiment of the present invention, the mobile device may not only include mobile devices such as a mobile phone, a tablet computer, a palmtop computer, and a mobile Internet device (MID), but also include in-vehicle communications devices such as an in-vehicle navigation device and an in-vehicle communications device. This is not limited this embodiment of the present invention.

In this embodiment of the present invention, when the cell cluster exclusively includes micro cells, the cell cluster may be deployed in a coverage area of a primary cell (for example, a macro cell), or the cell cluster may be deployed outside a coverage area of a primary cell (for example, a macro cell). This is not limited in this embodiment of the present invention.

In this embodiment of the present invention, the first part of system information needing to be used by any target cell in the cell cluster may be a special part of system information needing to be used by the target cell. The special part of system information is a part that is in system information needing to be used by the target cell and different from that in system information needing to be used by a primary cell (if any) and another cell in the cell cluster, or the special part of system information may be a part that is in system information needing to be used by the target cell and different from that in system information used by a primary cell. Different parts may include parts of a same type but with different assigned values. For example, the special part of system information used by any target cell in the cell cluster may include a physical random access channel (Physical Random Access Channel, PRACH) and a physical layer cell identity (PCI).

In this embodiment of the present invention, in step 101, the mobile device may obtain, after entering a coverage area of any target cell in the cell cluster, the first part of system information needing to be used by the target cell. Alternatively, in this embodiment of the present invention, the mobile device may obtain, after entering the coverage area of the primary cell (for example, the macro cell) and before entering a coverage area of any target cell in the cell cluster in the coverage area of the primary cell (for example, the macro cell), the first part of system information needing to be used by any target cell in the cell cluster. The mobile device may move to any target cell in the cell cluster along a highway or a high-speed railway in the coverage area of the primary cell (for example, the macro cell). Correspondingly, the primary cell (primarily a base station device of the primary cell) may predict that the mobile device moves to the target cell, and send the first part of system information needing to be used by the target cell to the mobile device in advance. That is, in this embodiment of the present invention, the mobile device may obtain, after entering the coverage area of any target cell in the cell cluster, the first part of system information needing to be used by the target cell, or may obtain, in advance before entering the coverage area of any target cell in the cell cluster, the first part of system information needing to be used by the target cell. This is not limited in this embodiment of the present invention.

102. The mobile device combines the first part of system information and a second part of system information that is prestored in the mobile device, to obtain system information needing to be used by the target cell; or replaces a part that is in prestored designated system information and that corresponds to the first part of system information with the first part of system information, to obtain system information needing to be used by the target cell.

In this embodiment of the present invention, the second part of system information prestored in the mobile device may be a general part of system information. The general part of system information is a part that is in system information needing to be used by any target cell in the cell cluster and is the same as that in system information needing to be used by a primary cell (if any) and another cell in the cell cluster, or may be a part that is in system information needing to be used by any target cell in the cell cluster and is the same as that in system information used by a primary cell. Same parts may include parts of a same type and with a same assigned value. For example, the general part of system information prestored in the mobile device may include a bandwidth, a maximum transmit power of a cell, and a broadcast message modification period.

In this embodiment of the present invention, the designated system information prestored in the mobile device may include the second part of system information (for example, the general part of system information) and a part that corresponds to the first part of system information (for example, the special part of system information). Therefore, after replacing the part that is in the prestored designated system information and that corresponds to the first part of system information (for example, the special part of system information) with the first part of system information (for example, the special part of system information), the mobile device may update the prestored designated system information, and may use updated designated system information as the system information needing to be used by the target cell.

In an embodiment, in the method described in FIG. 1, before performing step 101, the mobile device may further perform the following steps:

receiving, by the mobile device, the second part of system information (for example, the general part of system information) sent by the primary cell (for example, the macro cell), and storing the second part of system information, where the cell cluster is in the coverage area of the primary cell (for example, the macro cell), and the second part of system information (for example, the general part of system information) is a same part of system information needing to be used by cells in the cell cluster, and in an optional implementation, the second part of system information (for example, the general part of system information) may be a same part of system information needing to be used by the primary cell (for example, the macro cell); or receiving, by the mobile device, the designated system information sent by the primary cell (for example, the macro cell), and storing the designated system information, where the designated system information includes the second part of system information (for example, the general part of system information) and a part that corresponds to the first part of system information (for example, the special part of system information) and that needs to be used by all cells in the cell cluster, and in an optional implementation, the designated system information may be system information needing to be used by the primary cell (for example, the macro cell).

In this embodiment of the present invention, a manner of combining, by the mobile device, the first part of system information and the second part of prestored system information may be, for example: cascading the first part of system information and the second part of prestored system information. This is not limited in this embodiment of the present invention.

In an embodiment, in the method described in FIG. 1, step 101 may include:

receiving, by the mobile device after entering the coverage area of any target cell in the cell cluster, the first part of system information (for example, the special part of system information) that needs to be used by the target cell and that is sent by the target cell, where the first part of system information needing to be used by the target cell is obtained by the target cell by deducting, after the target cell receives the second part of system information (for example, the general part of system information) sent by the primary cell (for example, the macro cell), the second part of system information (for example, the general part of system information) from the system information needing to be used by the target cell.

That is, in this embodiment of the present invention, the target cell may receive in advance the second part of system information (for example, the general part of system information) sent by the primary cell (for example, the macro cell), and then deduct the second part of system information (for example, the general part of system information) from the system information needing to be used by the target cell, to obtain the first part of system information (for example, the special part of system information) needing to be used by the target cell. Further, the target cell may periodically broadcast the first part of system information (for example, the special part of system information) needing to be used by the target cell, so that after entering the coverage area of any target cell in the cell cluster, the mobile device can receive the first part of system information (for example, the special part of system information) that needs to be used by the target cell and that is sent by the target cell, or after entering the coverage area of any target cell in the cell cluster, the mobile device may send a system information request to the target cell, and correspondingly, the target cell may send or broadcast the first part of system information (for example, the special part of system information) needing to be used by the target cell to the mobile device in response to the request of the mobile device. The target cell may send the first part of system information (for example, the special part of system information) needing to be used by the target cell to the mobile device in a point-to-point manner.

In another embodiment, in the method described in FIG. 1, step 101 may include:

sending, by the mobile device, a system information request to the primary cell (for example, the macro cell) after entering the coverage area of any target cell in the cell cluster, where the cell cluster is in the coverage area of the primary cell (for example, the macro cell); and receiving, by the mobile device, the first part of system information (for example, the special part of system information) that needs to be used by the target cell and that is sent by the primary cell (for example, the macro cell) in response to the system information request, where the first part of system information (for example, the special part of system information) needing to be used by the target cell is obtained by the target cell by deducting, after the target cell receives the second part of system information (for example, the general part of system information) sent by the primary cell (for example, the macro cell), the second part of system information (for example, the general part of system information) from the system information needing to be used by the target cell, and is sent to the primary cell (for example, the macro cell).

That is, in this embodiment of the present invention, the target cell may receive in advance the second part of system information (for example, the general part of system information) sent by the primary cell (for example, the macro cell), and deduct the second part of system information (for example, the general part of system information) from the system information needing to be used by the target cell, to obtain the first part of system information (for example, the special part of system information) needing to be used by the target cell, and send the first part of system information to the primary cell (for example, the macro cell), so that after entering the coverage area of any target cell in the cell cluster, the mobile device may send the system information request to the primary cell (for example, the macro cell), to trigger the primary cell (for example, the macro cell) to send or broadcast the first part of system information (for example, the special part of system information) needing to be used by the target cell to the mobile device. The primary cell (for example, the macro cell) may send the first part of system information (for example, the special part of system information) needing to be used by the target cell to the mobile device in a point-to-point manner.

In still another embodiment, in the method described in FIG. 1, step 101 may include:

after entering the coverage area of any target cell in the cell cluster, receiving, by the mobile device, the first part of system information (for example, the special part of system information) that needs to be used by the target cell and that is sent by the primary cell (for example, the macro cell) according to location information of the mobile device, where the first part of system information (for example, the special part of system information) needing to be used by the target cell is obtained by the target cell by deducting, after the target cell receives the second part of system information (for example, the general part of system information) sent by the primary cell (for example, the macro cell), the second part of system information (for example, the general part of system information) from the system information needing to be used by the target cell, and is sent to the primary cell (for example, the macro cell).

That is, in this embodiment of the present invention, the target cell may receive in advance the second part of system information (for example, the general part of system information) sent by the primary cell (for example, the macro cell), and deduct the second part of system information (for example, the general part of system information) from the system information needing to be used by the target cell, to obtain the first part of system information (for example, the special part of system information), and send the first part of system information to the primary cell (for example, the macro cell), so that after the mobile device enters the coverage area of any target cell in the cell cluster, the primary cell (for example, the macro cell) can learn of the location information of the mobile device, and send or broadcast the first part of system information (for example, the special part of system information) needing to be used by the target cell to the mobile device according to the location information of the mobile device. The primary cell (for example, the macro cell) may send the first part of system information (for example, the special part of system information) needing to be used by the target cell to the mobile device in a point-to-point manner.

It can be learned that, according to the system information obtaining method in a cell cluster described in FIG. 1, a mobile device can consume relatively little power and time to obtain entire system information needing to be used by a target cell, thereby improving efficiency of obtaining, by the mobile device, entire system information, and reducing power consumption of the mobile device. In addition, according to the system information obtaining method in a cell cluster described in FIG. 1, a cell does not need to periodically broadcast entire system information, thereby effectively reducing transmit power consumption of a network side device.

Figure 2:
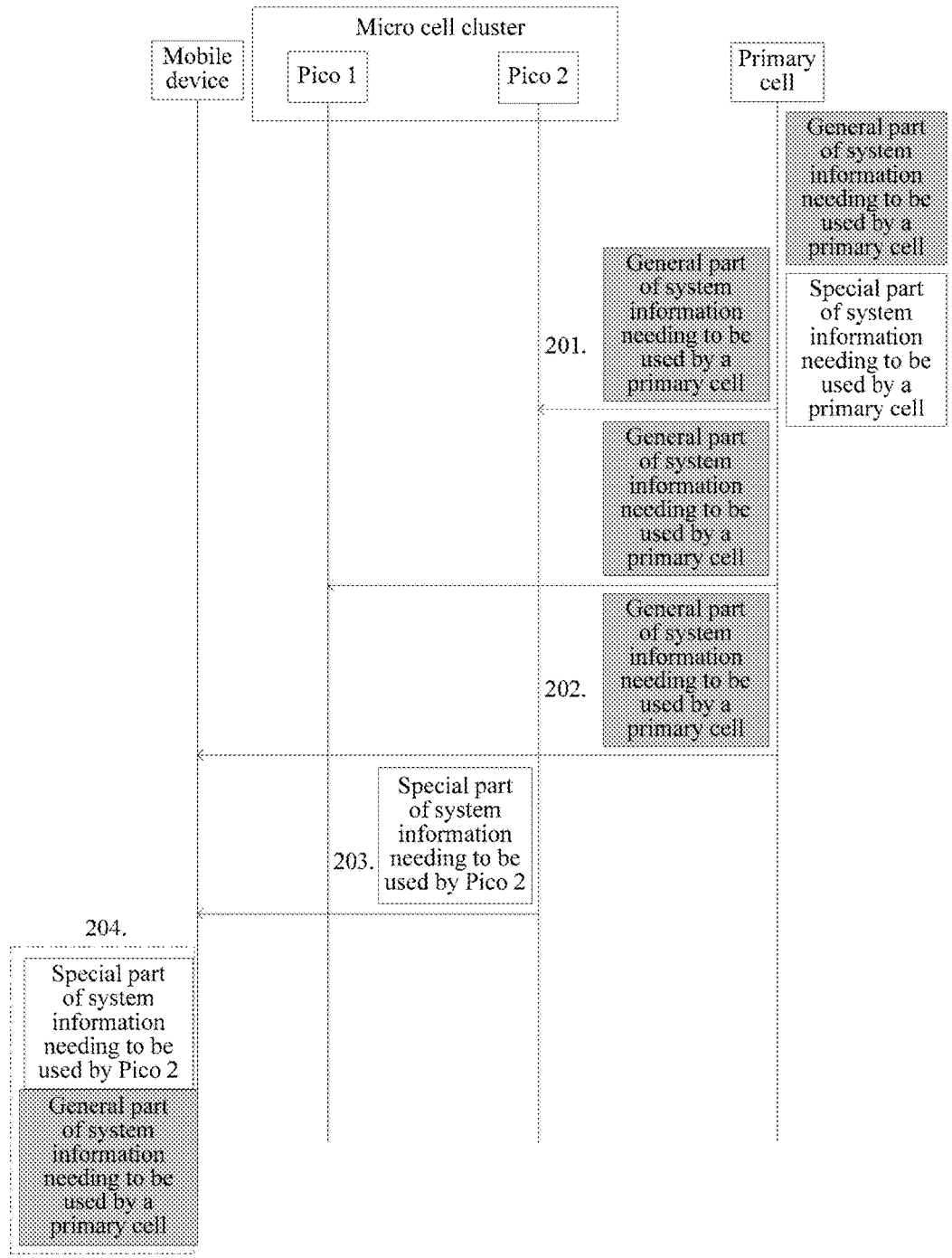
FIG. 2 is a schematic flowchart of another system information obtaining method in a cell cluster according to an embodiment of the present invention.

Referring to FIG. 2, FIG. 2 is a schematic flowchart of another system information obtaining method in a cell cluster according to an embodiment of the present invention. In the method described in FIG. 2, it is assumed that a cell cluster is a micro cell cluster including multiple micro cells, the micro cell cluster is in a coverage area of a primary cell (for example, a macro cell), and the primary cell (for example, the macro cell) may divide entire system information of the primary cell into two parts: a general part of system information needing to be used by the primary cell (for example, the macro cell) and a special part of system information needing to be used by the primary cell (for example, the macro cell). The general part of system information needing to be used by the primary cell (for example, the macro cell) and a general part of system information needing to be used by any micro cell in the micro cell cluster are the same, and the special part of system information needing to be used by the primary cell (for example, the macro cell) and a special part of system information needing to be used by any micro cell in the micro cell cluster may be the same or may be different. This is not limited in this embodiment of the present invention. As shown in FIG. 2, the method may include the following steps.

201. The primary cell (for example, the macro cell) sends the general part of system information needing to be used by the primary cell to each target micro cell (for example, Pico 1 and Pico 2) in the micro cell cluster, so that after receiving the general part of system information sent by the primary cell (for example, the macro cell), each target micro cell deducts the general part of system information from system information needing to be used by the target micro cell, to obtain a special part of system information needing to be used by the target micro cell.

202. The primary cell (for example, the macro cell) sends the general part of system information needing to be used by the primary cell to a mobile device in a coverage area of the primary cell (for example, the macro cell) for prestorage.

In this embodiment of the present invention, a sequence of performing step 201 and step 202 is not limited.

In this embodiment of the present invention, the primary cell (for example, the macro cell) may actively send the general part of system information needing to be used by the primary cell to the mobile device in the coverage area of the primary cell (for example, the macro cell) for prestorage. Alternatively, the primary cell (for example, the macro cell) may send, according to a request of the mobile device in the coverage area of the primary cell (for example, the macro cell), the general part of system information needing to be used by the primary cell to the mobile device in the coverage area of the primary cell (for example, the macro cell) for prestorage.

In this embodiment of the present invention, the primary cell may send, in advance before the mobile device enters a coverage area of any target micro cell in the micro cell cluster, the general part of system information needing to be used by the primary cell to the mobile device for prestorage.

203. The mobile device obtains, after entering a coverage area of any target micro cell (for example, Pico 2) in the micro cell cluster, the special part of system information used by the target micro cell (for example, Pico 2).

In this embodiment of the present invention, the target micro cell may periodically broadcast the special part of system information needing to be used by the target micro cell, so that after entering the coverage area of the target micro cell, the mobile device can receive the special part of system information that needs to be used by the target micro cell and that is sent by the target micro cell. Alternatively, after entering the coverage area of the target micro cell, the mobile device may send a system information request to the target micro cell, and correspondingly, the target micro cell may send or broadcast the special part of system information needing to be used by the target micro cell to the mobile device in response to the request of the mobile device.

204. The mobile device combines the special part of system information and the general part of system information that is prestored in the mobile device, to obtain the system information needing to be used by the target micro cell (for example, Pico 2).

It can be learned that, according to the system information obtaining method in a cell cluster described in FIG. 2, a mobile device can consume relatively little power and time to obtain entire system information needing to be used by a target micro cell, thereby improving efficiency of obtaining, by the mobile device, entire system information, and reducing power consumption of the mobile device. In addition, according to the system information obtaining method in a cell cluster described in FIG. 2, a micro cell does not need to periodically broadcast entire system information, thereby effectively reducing transmit power consumption of a network side device.

In an embodiment, the primary cell (for example, the macro cell) may generate the general part of system information according to a protocol regulation, and the target micro cell may generate the special part of system information according to a protocol regulation. The primary cell and the target micro cell perform their respective functions. This is not limited in this embodiment of the present invention.

Figure 3:
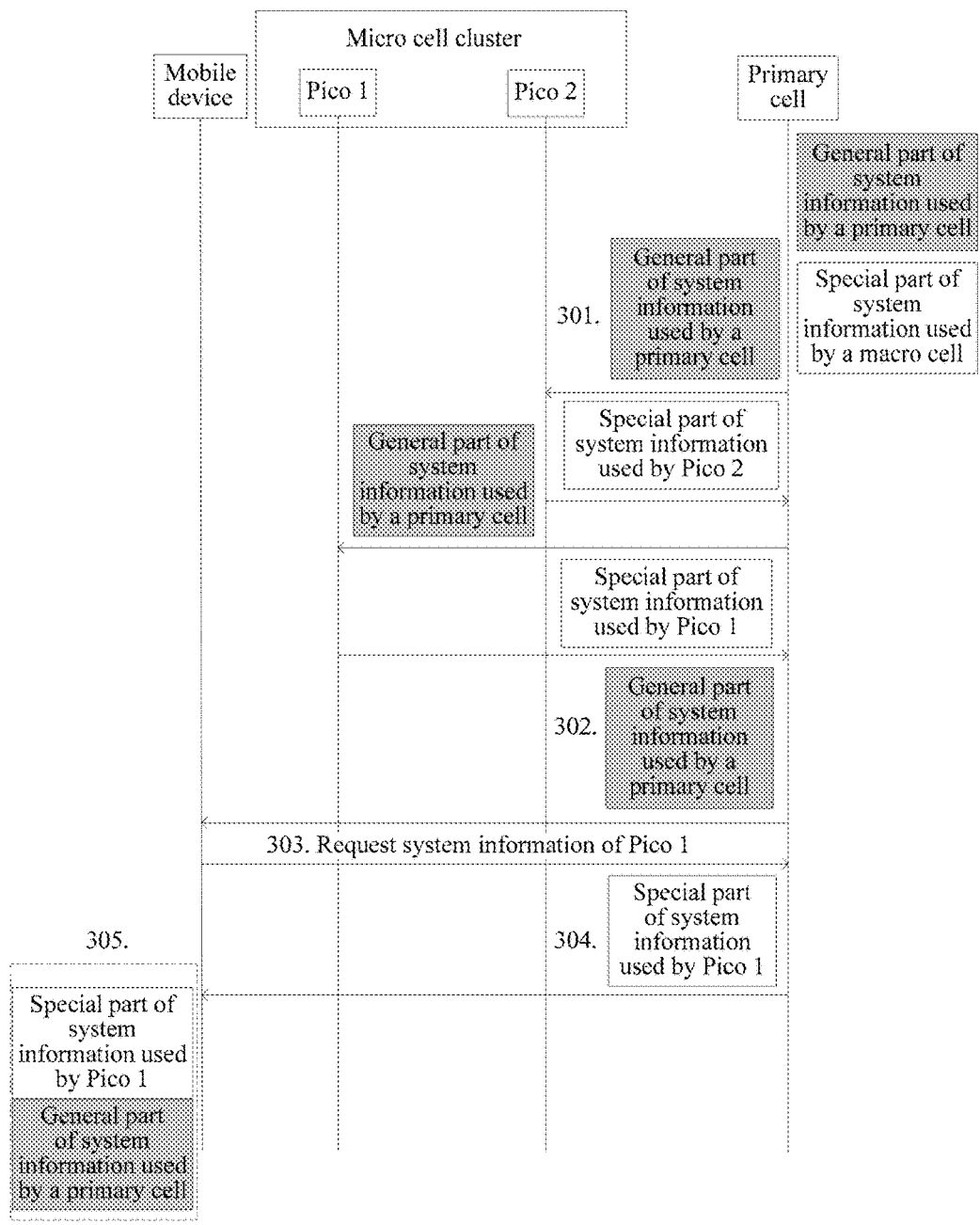
FIG. 3 is a schematic flowchart of another system information obtaining method in a cell cluster according to an embodiment of the present invention.

Referring to FIG. 3, FIG. 3 is a schematic flowchart of another system information obtaining method in a cell cluster according to an embodiment of the present invention. In the method described in FIG. 3, it is assumed that a cell cluster is a micro cell cluster including multiple micro cells, the micro cell cluster is in a coverage area of a primary cell (for example, a macro cell), and the primary cell (for example, the macro cell) may divide entire system information of the primary cell into two parts: a general part of system information needing to be used by the primary cell (for example, the macro cell) and a special part of system information needing to be used by the primary cell (for example, the macro cell). The general part of system information needing to be used by the primary cell (for example, the macro cell) and a general part of system information needing to be used by all micro cells in the micro cell cluster are the same, and the special part of system information needing to be used by the primary cell (for example, the macro cell) and a special part of system information needing to be used by all micro cells in the micro cell cluster may be the same or may be different. This is not limited in this embodiment of the present invention. As shown in FIG. 3, the method may include the following steps.

301. The primary cell (for example, the macro cell) sends the general part of system information needing to be used by the primary cell to each target micro cell (for example, Pico 1 and Pico 2) in the micro cell cluster, so that after receiving the general part of system information sent by the primary cell (for example, the macro cell), each target micro cell deducts the general part of system information from system information needing to be used by the target micro cell, to obtain a special part of system information needing to be used by the target micro cell, and sends the special part of system information to the primary cell (for example, the macro cell).

302. The primary cell (for example, the macro cell) sends the general part of system information needing to be used by the primary cell to a mobile device in a coverage area of the primary cell (for example, the macro cell) for prestorage.

In this embodiment of the present invention, a sequence of performing step 301 and step 302 is not limited.

In this embodiment of the present invention, the primary cell (for example, the macro cell) may actively send the general part of system information needing to be used by the primary cell to the mobile device in the coverage area of the primary cell (for example, the macro cell) for prestorage. Alternatively, the primary cell (for example, the macro cell) may send, according to a request of the mobile device in the coverage area of the primary cell (for example, the macro cell), the general part of system information needing to be used by the primary cell to the mobile device in the coverage area of the primary cell (for example, the macro cell) for prestorage.

303. The mobile device sends a system information request to the primary cell (for example, the macro cell) after entering a coverage area of any target micro cell (for example, Pico 1) in the micro cell cluster.

304. The mobile device receives the special part of system information that needs to be used by the target micro cell (for example, Pico 1) and that is sent by the primary cell (for example, the macro cell) in response to the system information request.

305. The mobile device combines the special part of system information and the general part of system information that is prestored in the mobile device, to obtain the system information needing to be used by the target micro cell (for example, Pico 1).

In this embodiment of the present invention, a manner of combining, by the mobile device, the special part of system information and the general part of system information that is prestored in the mobile device may be, for example: cascading the special part of system information and the general part of system information that is prestored in the mobile device. This is not limited in this embodiment of the present invention.

In the method described in FIG. 3, the primary cell (for example, the macro cell) may send the special part of system information needing to be used by the target micro cell (for example, Pico 1) to the mobile device in response to the system information request sent by the mobile device, or may actively send the special part of system information needing to be used by the target micro cell (for example, Pico 1) to the mobile device according to location information of the mobile device.

It can be learned that, according to the system information obtaining method in a cell cluster described in FIG. 3, a mobile device can consume relatively little power and time to obtain entire system information needing to be used by a target micro cell, thereby improving efficiency of obtaining, by the mobile device, entire system information, and reducing power consumption of the mobile device. In addition, according to the system information obtaining method in a cell cluster described in FIG. 3, a micro cell does not need to periodically broadcast entire system information, thereby effectively reducing transmit power consumption of a network side device.

Figure 4:
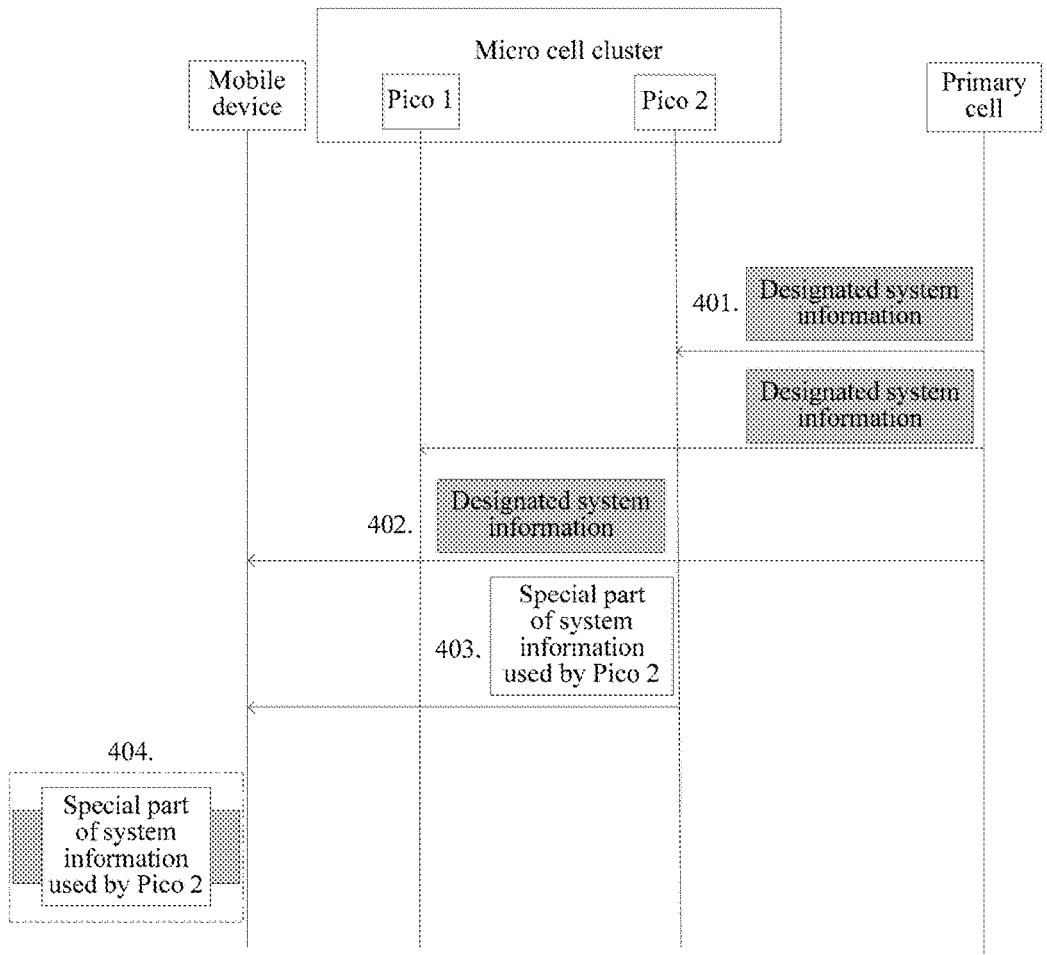
FIG. 4 is a schematic flowchart of another system information obtaining method in a cell cluster according to an embodiment of the present invention.

Referring to FIG. 4, FIG. 4 is a schematic flowchart of another system information obtaining method in a cell cluster according to an embodiment of the present invention. In the method described in FIG. 4, it is assumed that a cell cluster is a micro cell cluster including multiple micro cells, the micro cell cluster is in a coverage area of a primary cell (for example, a macro cell), and the primary cell (for example, the macro cell) may use, as designated system information, system information needing to be used by the primary cell, and divide the designated system information into two parts: a general part of system information needing to be used by the primary cell (for example, the macro cell) and a special part of system information needing to be used by the primary cell (for example, the macro cell). The general part of system information needing to be used by the primary cell (for example, the macro cell) and a general part of system information needing to be used by each micro cell in the micro cell cluster are the same, and the special part of system information needing to be used by the primary cell (for example, the macro cell) and a special part of system information needing to be used by each micro cell in the micro cell cluster may be different. This is not limited in this embodiment of the present invention. As shown in FIG. 4, the method may include the following steps.

401. The primary cell (for example, the macro cell) sends the designated system information to each target micro cell (for example, Pico 1 and Pico 2) in the micro cell cluster, so that after receiving the designated system information sent by the primary cell (for example, the macro cell), each target micro cell deducts the general part of system information included in the designated system information from system information needing to be used by the target micro cell, to obtain a special part of system information needing to be used by the target micro cell.

402. The primary cell (for example, the macro cell) sends the designated system information to a mobile device in a coverage area of the primary cell (for example, the macro cell) for prestorage.

In this embodiment of the present invention, a sequence of performing step 401 and step 402 is not limited.

In this embodiment of the present invention, the primary cell (for example, the macro cell) may actively send the designated system information to the mobile device in the coverage area of the primary cell (for example, the macro cell) for prestorage. Alternatively, the primary cell (for example, the macro cell) may send, according to a request of the mobile device in the coverage area of the primary cell (for example, the macro cell), the designated system information to the mobile device in the coverage area of the primary cell (for example, the macro cell) for prestorage.

403. The mobile device obtains, after entering a coverage area of any target micro cell (for example, Pico 2) in the micro cell cluster, the special part of system information needing to be used by the target micro cell (for example, Pico 2).

In this embodiment of the present invention, the target micro cell may periodically broadcast the special part of system information needing to be used by the target micro cell, so that after entering the coverage area of the target micro cell, the mobile device can receive the special part of system information that needs to be used by the target micro cell and that is sent by the target micro cell. Alternatively, after entering the coverage area of the target micro cell, the mobile device may send a system information request to the target micro cell, and correspondingly, the target micro cell may send or broadcast the special part of system information needing to be used by the target micro cell to the mobile device in response to the request of the mobile device. The target micro cell may send the special part of system information needing to be used by the target micro cell to the mobile device in a point-to-point manner.

404. The mobile device replaces a part that is in the prestored designated system information and that corresponds to the special part of system information with the special part of system information, to obtain the system information needing to be used by the target micro cell.

In this embodiment of the present invention, after replacing the part that is in the prestored designated system information and that corresponds to the special part of system information with the special part of system information, the mobile device may update the prestored designated system information, and use the updated designated system information as the target system information needing to be used by the target micro cell.

In this embodiment of the present invention, the part that is in the designated system information prestored in the mobile device and that corresponds to the special part of system information may include the special part of system information needing to be used by the primary cell (for example, the macro cell).

It can be learned that, according to the system information obtaining method in a cell cluster described in FIG. 4, a mobile device can consume relatively little power and time to obtain entire system information needing to be used by a target micro cell, thereby improving efficiency of obtaining, by the mobile device, entire system information, and reducing power consumption of the mobile device. In addition, according to the system information obtaining method in a micro cell cluster described in FIG. 4, a micro cell does not need to periodically broadcast entire system information, thereby effectively reducing transmit power consumption of a network side device.

Figure 5:
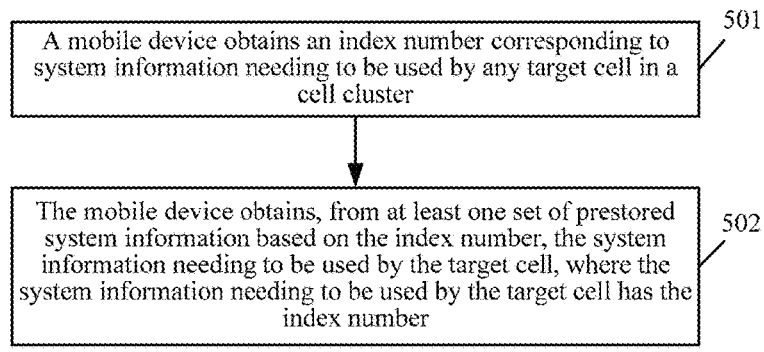
FIG. 5 is a schematic flowchart of another system information obtaining method in a cell cluster according to an embodiment of the present invention.

Referring to FIG. 5, FIG. 5 is a schematic flowchart of another system information obtaining method in a cell cluster according to an embodiment of the present invention. As shown in FIG. 5, the method may include the following steps.

501. A mobile device obtains an index number corresponding to system information needing to be used by any target cell in the cell cluster.

In this embodiment of the present invention, the mobile device may obtain, after entering a coverage area of any target cell in the cell cluster, the index number corresponding to the system information needing to be used by the target cell. Alternatively, the mobile device may move to any target cell in the cell cluster in a coverage area of a primary cell (for example, a macro cell) along a highway or a high-speed railway in the coverage area of the primary cell (for example, the macro base station), and correspondingly, the primary cell (primarily a base station device of the primary cell) may predict that the mobile device moves to the target cell, and send the index number corresponding to the system information needing to be used by the target cell to the mobile device in advance. That is, in this embodiment of the present invention, the mobile device may obtain, after entering the coverage area of any target cell in the cell cluster, the index number corresponding to the system information needing to be used by the target cell, or may obtain, in advance before entering the coverage area of any target cell in the cell cluster, the index number corresponding to the system information needing to be used by the target cell. This is not limited in this embodiment of the present invention.

502. The mobile device obtains, from at least one set of prestored system information based on the index number, the system information needing to be used by the target cell, where the system information needing to be used by the target cell has the index number.

In an embodiment, in the method described in FIG. 5, before performing step 501, the mobile device may further perform the following steps:

receiving and storing, by the mobile device, the at least one set of system information sent by the primary cell (for example, the macro cell), where each set of the system information has a corresponding index number, the cell cluster is in the coverage area of the primary cell (for example, the macro cell), and each set of the system information corresponds to one micro cell in the cell cluster.

In this embodiment of the present invention, the primary cell (for example, the macro cell) may actively send the at least one set of system information to the mobile device in the coverage area of the primary cell (for example, the macro cell) for prestorage. Alternatively, the primary cell (for example, the macro cell) may send, according to a request of the mobile device in the coverage area of the primary cell (for example, the macro cell), the at least one set of system information to the mobile device in the coverage area of the primary cell (for example, the macro cell) for prestorage.

In an embodiment, in the method described in FIG. 5, step 501 may include:

receiving, by the mobile device after entering the coverage area of any target cell in the cell cluster, the index number that corresponds to the system information used by the target cell and that is sent by the target cell on an air interface.

In another embodiment, in the method described in FIG. 5, step 501 may include:

after entering the coverage area of any target cell in the cell cluster, receiving, by the mobile device, a first indication message sent by the primary cell (for example, the macro cell), where the first indication message is used to instruct to start index number receiving; and receiving, by the mobile device in response to the first indication message, the index number that corresponds to the system information needing to be used by the target cell and that is sent by the target cell on the air interface.

Implementation of the foregoing manner can allow the mobile device to obtain, only when instructed by the primary cell (for example, the macro cell), the index number corresponding to the system information needing to be used by the target cell, and obtain, from the at least one set of prestored system information, the system information that needs to be used by the target cell and that corresponds to the index number. In this way, the mobile device does not need to periodically read the system information needing to be used by the target cell, thereby reducing power consumption of the mobile device.

In this embodiment of the present invention, the index number corresponding to the system information needing to be used by the target cell is sent by the target cell after the target cell receives a second indication message sent by the primary cell (for example, the macro cell), where the second indication message is sent by the primary cell (for example, the macro cell) to the target cell after the primary cell detects that the mobile device enters the coverage area of the target cell, and the second indication message is used to instruct to start index number sending. In this way, the target cell does not need to periodically send the system information needing to be used by the target cell, thereby reducing transmit power consumption of the target cell.

In another embodiment, in the method described in FIG. 5, step 501 may include:

after the mobile device enters the coverage area of any target cell in the cell cluster, directly sending, by the primary cell (for example, the macro cell), the index number corresponding to the system information needing to be used by the target cell to the mobile device (for example, in a point-to-point manner) according to location information of the mobile device, so that the mobile device obtains the system information needing to be used by the target cell from the at least one set of prestored system information based on the index number.

It can be learned that, according to the system information obtaining method in a cell cluster described in FIG. 5, by using extremely little power and time, system information needing to be used by a target cell can be obtained from at least one set of prestored system information based on an index number, thereby improving efficiency of obtaining, by a mobile device, entire system information, and reducing power consumption of the mobile device.

Figure 6:
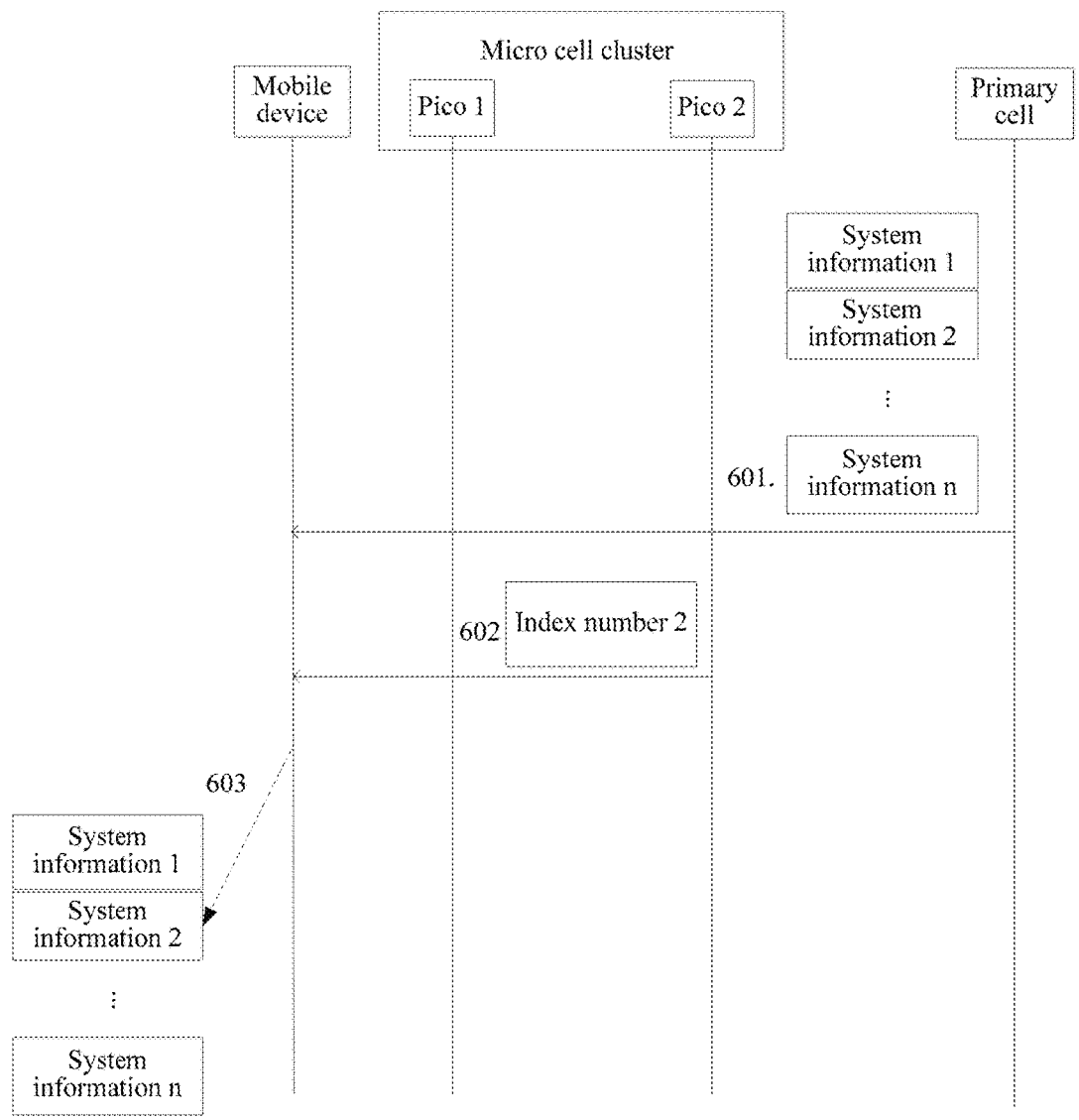
FIG. 6 is a schematic flowchart of another system information obtaining method in a cell cluster according to an embodiment of the present invention.

Referring to FIG. 6, FIG. 6 is a schematic flowchart of another system information obtaining method in a cell cluster according to an embodiment of the present invention. In the method described in FIG. 6, it is assumed that the cell cluster is a micro cell cluster including multiple micro cells, and the micro cell cluster is in a coverage area of a primary cell (for example, a macro cell). As shown in FIG. 6, the method may include the following steps.

601. A mobile device receives and stores multiple sets of system information 1 to n (that is, SIB config1, SIB config2, . . . , SIB confign) sent by the primary cell (for example, the macro cell), where the multiple sets of system information have corresponding index numbers 1 to n (that is, SIB config1 index, and SIB config2 index), and each set of system information corresponds to one micro cell in the micro cell cluster (for example, Pico 1 corresponds to SIB config1, and Pico 2 corresponds to SIB config2).

In this embodiment of the present invention, the primary cell (for example, the macro cell) may actively send the multiple sets of system information to the mobile device in the coverage area of the primary cell (for example, the macro cell) for prestorage. Alternatively, the primary cell (for example, the macro cell) may send, according to a request of the mobile device in the coverage area of the primary cell (for example, the macro cell), one or more sets of system information to the mobile device in the coverage area of the primary cell (for example, the macro cell) for prestorage.

602. The mobile device obtains, after entering a coverage area of any target micro cell (for example, Pico 2) in the micro cell cluster, an index number 2 (that is, SIB config2 index) corresponding to the system information needing to be used by the target micro cell (for example, Pico 2).

603. The mobile device obtains, from the multiple sets of prestored system information based on the index number 2 (that is, SIB config2 index), the system information 2 (that is, SIB config2) needing to be used by the target cell (for example, Pico 2), where the system information 2 (that is, the SIB config2) needing to be used by the target cell (for example, Pico 2) has the index number 2 (that is, SIB config2 index).

It can be learned that, according to the system information obtaining method in a cell cluster described in FIG. 6, by using extremely little power and time, system information needing to be used by a target cell can be obtained from multiple sets of prestored system information based on an index number, thereby improving efficiency of obtaining, by a mobile device, entire system information, and reducing power consumption of the mobile device.

Figure 7:
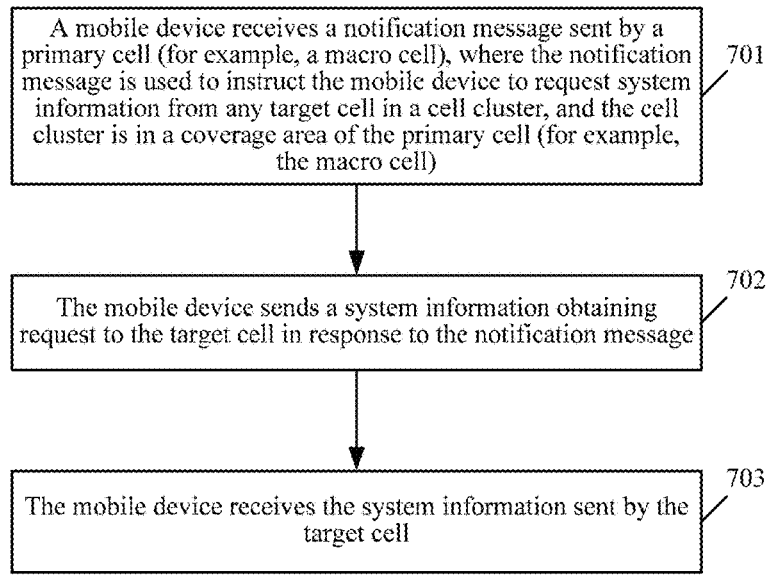
FIG. 7 is a schematic flowchart of another system information obtaining method in a cell cluster according to an embodiment of the present invention.

Referring to FIG. 7, FIG. 7 is a schematic flowchart of another system information obtaining method in a cell cluster according to an embodiment of the present invention. As shown in FIG. 7, the method may include the following steps.

701. A mobile device receives a notification message sent by a primary cell (for example, a macro cell), where the notification message is used to instruct the mobile device to request system information from any target cell in the cell cluster, and the cell cluster is in a coverage area of the primary cell (for example, the macro cell).

In this embodiment of the present invention, after entering a coverage area of any target cell in the cell cluster, the mobile device receives the notification message sent by the primary cell (for example, the macro cell). Alternatively, the mobile device may move to any target cell in the cell cluster in the coverage area of the primary cell (for example, the macro cell) along a highway or a high-speed railway in the coverage area of the primary cell (for example, the macro base station), and correspondingly, the primary cell (primarily a base station device of the primary cell) may predict that the mobile device moves to the target cell, and send, to the mobile device in advance, the notification message used to instruct the mobile device to request the system information from the target cell. That is, in this embodiment of the present invention, the mobile device may receive, after entering the coverage area of any target cell in the cell cluster, the notification message sent by the primary cell (for example, the macro cell), or may receive, in advance before entering the coverage area of any target cell in the cell cluster, the notification message sent by the primary cell (for example, the macro cell). This is not limited in this embodiment of the present invention.

702. The mobile device sends a system information obtaining request to the target cell in response to the notification message.

703. The mobile device receives the system information sent by the target cell.

It can be learned that, according to the system information obtaining method in a cell cluster described in FIG. 7, a target cell sends system information needing to be used by the target cell to a mobile device only when receiving a system information obtaining request sent by the mobile device. That is, if the mobile device does not send the system information request, the target cell does not send the system information needing to be used by the target cell. Compared with that a cell periodically broadcasts entire system information, this embodiment of the present invention can effectively reduce transmit power consumption of a network side device. In addition, in this embodiment of the present invention, the mobile device requests the system information needing to be used by the target cell from the target cell only when receiving a notification of a primary cell (for example, a macro cell). Compared with that a mobile device periodically reads entire system information used by a target cell, this embodiment of the present invention can effectively reduce power consumption of the mobile device.

Figure 8A:
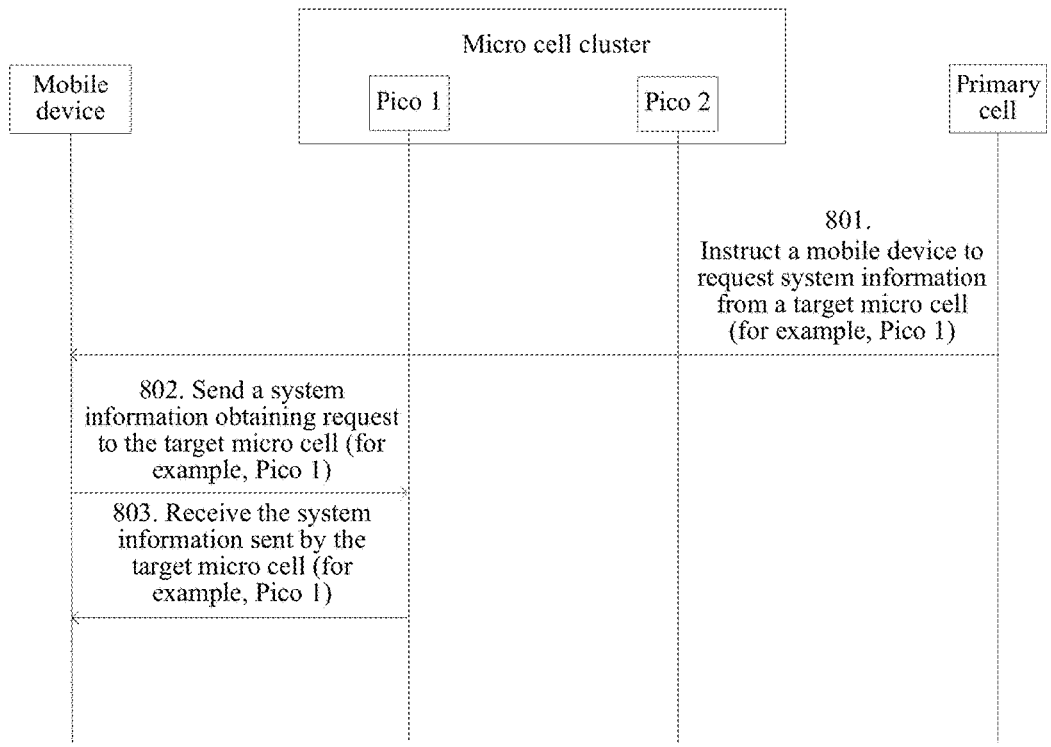
FIG. 8a is a schematic flowchart of another system information obtaining method in a cell cluster according to an embodiment of the present invention.

Referring to FIG. 8a, FIG. 8a is a schematic flowchart of another system information obtaining method in a cell cluster according to an embodiment of the present invention. In the method described in FIG. 8a, it is assumed that the cell cluster is a micro cell cluster including multiple micro cells, and the micro cell cluster is in a coverage area of a primary cell (for example, a macro cell). As shown in FIG. 8a, the method may include the following steps:

801a. After detecting that a mobile device enters a coverage area of any target micro cell (for example, Pico 1) in the micro cell cluster, the primary cell (for example, the macro cell) sends a notification message to the mobile device, where the notification message is used to instruct the mobile device to request system information from the target micro cell (for example, Pico 1).

802a. The mobile device sends a system information obtaining request to the target micro cell (for example, Pico 1) in response to the notification message.

803a. The mobile device receives the system information sent by the target micro cell (for example, Pico 1).

It can be learned that, according to the system information obtaining method in a cell cluster described in FIG. 8a, a target micro cell sends system information needing to be used by the target micro cell to a mobile device only when receiving a system information obtaining request sent by the mobile device. That is, if the mobile device does not send the system information request, the target micro cell does not send the system information needing to be used by the target micro cell. Compared with that a micro cell periodically broadcasts entire system information, this embodiment of the present invention can effectively reduce transmit power consumption of a micro cell. In addition, in this embodiment of the present invention, the mobile device requests the system information needing to be used by the target micro cell from the target micro cell only when receiving a notification of a primary cell (for example, a macro cell). Compared with that a mobile device periodically reads entire system information used by a target micro cell, this embodiment of the present invention can effectively reduce power consumption of the mobile device.

Figure 8B:
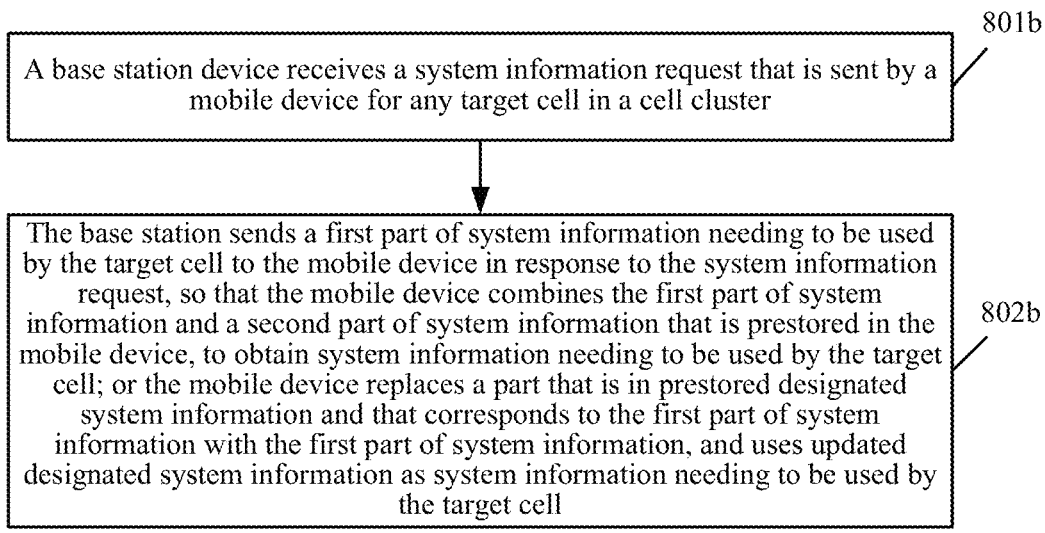
FIG. 8b is a schematic flowchart of another system information obtaining method in a cell cluster according to an embodiment of the present invention.

Referring to FIG. 8b, FIG. 8b is a schematic flowchart of another system information obtaining method in a cell cluster according to an embodiment of the present invention. As shown in FIG. 8b, the method may include the following steps:

801b. A base station device receives a system information request that is sent by a mobile device for any target cell in the cell cluster.

802b. The base station device sends a first part of system information needing to be used by the target cell to the mobile device in response to the system information request, so that the mobile device combines the first part of system information and a second part of system information that is prestored in the mobile device, to obtain system information needing to be used by the target cell; or the mobile device replaces a part that is in prestored designated system information and that corresponds to the first part of system information with the first part of system information, and uses updated designated system information as system information needing to be used by the target cell.

In this embodiment of the present invention, the method described in FIG. 8b may further include the following steps:

sending, by the base station device, the second part of system information to the mobile device, where the second part of system information is a same part of system information needing to be used by all cells in the cell cluster; or sending the designated system information to the mobile device, where the designated system information includes the second part of system information and the part that corresponds to the first part of system information and that needs to be used by all cells in the cell cluster.

In this embodiment of the present invention, the base station device may be a base station device of a primary cell, and the cell cluster may be in a coverage area of the primary cell.

In this embodiment of the present invention, after entering any target cell in the cell cluster, the mobile device sends the system information request for the target cell to the base station device.

In this embodiment of the present invention, the second part of system information and the first part of system information have already been described in the foregoing embodiments by using an example, and details are not described herein again.

It can be learned that, according to the system information obtaining method in a cell cluster described in FIG. 8b, entire system information needing to be used by a target cell can be obtained by using extremely little power and time, thereby improving efficiency of obtaining, by a mobile device, the entire system information, and reducing power consumption of the mobile device.

Figure 8C:
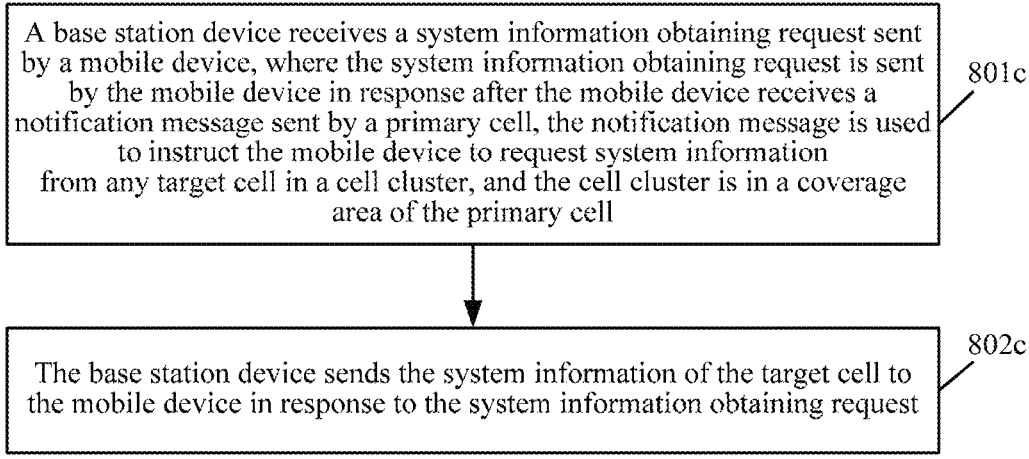
FIG. 8c is a schematic flowchart of another system information obtaining method in a cell cluster according to an embodiment of the present invention.

Referring to FIG. 8c, FIG. 8c is a schematic flowchart of another system information obtaining method in a cell cluster according to an embodiment of the present invention. As shown in FIG. 8c, the method may include the following steps:

801c. A base station device receives a system information obtaining request sent by a mobile device, where the system information obtaining request is sent by the mobile device in response after the mobile device receives a notification message sent by a primary cell, the notification message is used to instruct the mobile device to request system information from any target cell in the cell cluster, and the cell cluster is in a coverage area of the primary cell.

802c. The base station device sends the system information of the target cell to the mobile device in response to the system information obtaining request.

In this embodiment of the present invention, after entering any target cell in the cell cluster, the mobile device may receive the notification message sent by the primary cell, and sends the system information obtaining request to the target cell in response to the notification message. Further, the base station device may be a base station device of the target cell.

It can be learned that, according to the system information obtaining method in a cell cluster described in FIG. 8c, a mobile device requests system information needing to be used by a target cell from the target cell only when receiving a notification of a primary cell (for example, a macro cell). Compared with that a mobile device periodically reads entire system information used by a target cell, this embodiment of the present invention can effectively reduce power consumption of the mobile device.

Figure 9:
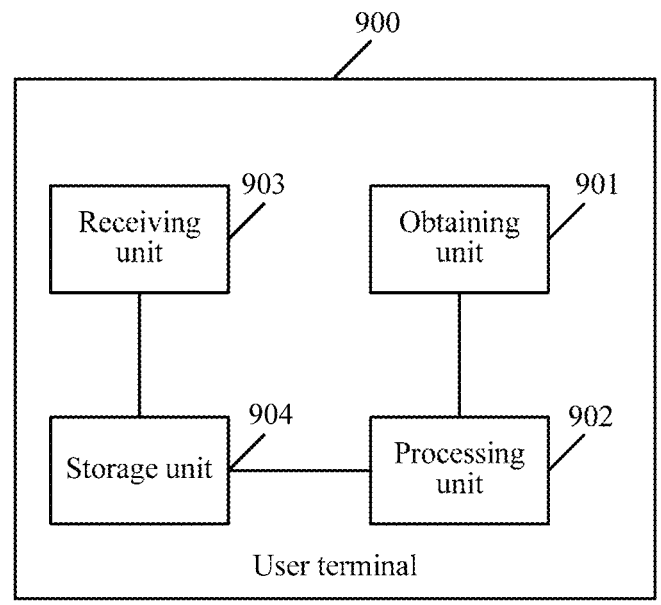
FIG. 9 is a schematic structural diagram of a mobile device according to an embodiment of the present invention.

Referring to FIG. 9, FIG. 9 is a schematic structural diagram of a mobile device according to an embodiment of the present invention. The mobile device shown in FIG. 9 may be configured to execute the system information obtaining method in a cell cluster disclosed in the embodiments of the present invention. As shown in FIG. 9, the mobile device 900 may include:

an obtaining unit 901, configured to obtain a first part of system information (for example, a special part of system information) needing to be used by any target cell in the cell cluster; and a processing unit 902, configured to combine the first part of system information (for example, the special part of system information) and a second part of prestored system information (for example, a general part of system information), to obtain system information needing to be used by the target cell; or a processing unit 902, configured to replace a part that is in designated system information prestored in the mobile device 900 and that corresponds to the first part of system information (for example, the special part of system information) with the first part of system information (for example, the special part of system information), to obtain system information needing to be used by the target cell.

In an embodiment, the mobile device 900 in FIG. 9 further includes:

a receiving unit 903, configured to receive the second part of system information (for example, the general part of system information) sent by a primary cell (for example, a macro cell), where the cell cluster is in a coverage area of the primary cell (for example, the macro cell), and the second part of system information (for example, the general part of system information) is a same part of system information needing to be used by all cells in the cell cluster; and a storage unit 904, configured to store the second part of system information (for example, the general part of system information); or a receiving unit 903, configured to receive the designated system information sent by a primary cell (for example, a macro cell), where the designated system information includes the second part of system information (for example, the general part of system information) and a part that corresponds to the first part of system information (for example, the special part of system information) and that needs to be used by all cells in the cell cluster; and a storage unit 904, configured to store the designated system information.

In an embodiment, the obtaining unit 901 is specifically configured to: after the mobile device 900 enters a coverage area of any target cell in the cell cluster, obtain the first part of system information (for example, the special part of system information) needing to be used by the target cell.

In an embodiment, the obtaining unit 901 is specifically configured to: after the mobile device 900 enters the coverage area of any target cell in the cell cluster, receive the first part of system information (for example, the special part of system information) that needs to be used by the target cell and that is sent by the target cell, where the first part of system information (for example, the special part of system information) needing to be used by the target cell is obtained by the target cell by deducting, after the target cell receives the second part of system information (for example, the general part of system information) sent by the primary cell (for example, the macro cell), the second part of system information (for example, the general part of system information) from the system information needing to be used by the target cell.

In another embodiment, the obtaining unit 901 is specifically configured to: after the mobile device 900 enters the coverage area of any target cell in the cell cluster, send a system information request to the primary cell (for example, the macro cell), and receive the first part of system information (for example, the special part of system information) that needs to be used by the target cell and that is sent by the primary cell (for example, the macro cell) in response to the system information request, where the first part of system information (for example, the special part of system information) needing to be used by the target cell is obtained by the target cell by deducting, after the target cell receives the second part of system information (for example, the general part of system information) sent by the primary cell (for example, the macro cell), the second part of system information (for example, the general part of system information) from the system information needing to be used by the target cell, and is sent to the primary cell (for example, the macro cell).

In another embodiment, the obtaining unit 901 is specifically configured to: after the mobile device 900 enters the coverage area of any target cell in the cell cluster, receive the first part of system information (for example, the special part of system information) that needs to be used by the target cell and that is sent by the primary cell (for example, the macro cell) according to location information of the mobile device 900, where the first part of system information (for example, the special part of system information) needing to be used by the target cell is obtained by the target cell by deducting, after the target cell receives the second part of system information (for example, the general part of system information) sent by the primary cell (for example, the macro cell), the second part of system information (for example, the general part of system information) from the system information needing to be used by the target cell, and is sent to the primary cell (for example, the macro cell).

It can be learned that, according to the mobile device described in FIG. 9, the mobile device can consume relatively little power and time to obtain entire system information needing to be used by a target cell, thereby improving efficiency of obtaining, by the mobile device, entire system information, and reducing power consumption of the mobile device. In addition, according to the mobile device described in FIG. 9, a cell does not need to periodically broadcast entire system information, thereby effectively reducing transmit power consumption of a network side device.

Figure 10A:
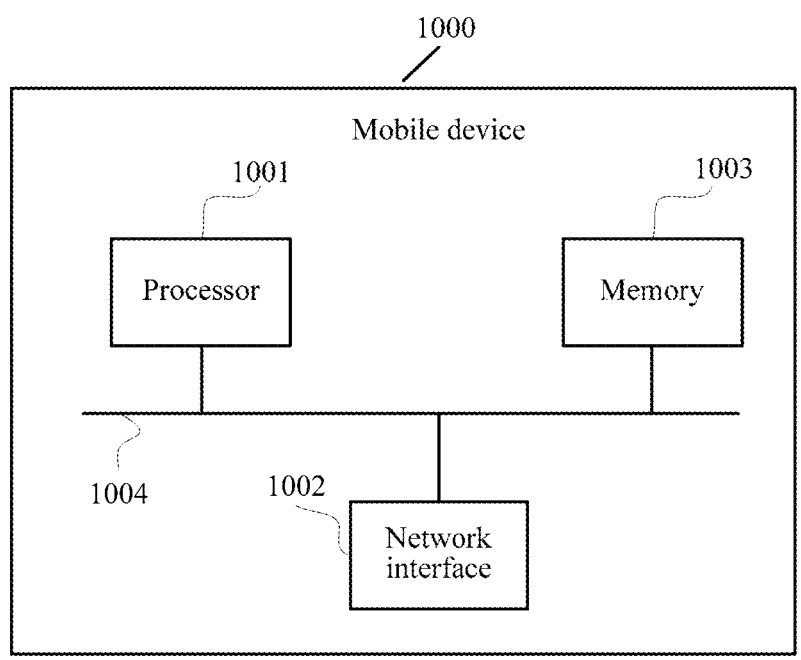
FIG. 10a is a schematic structural diagram of another mobile device according to an embodiment of the present invention.

Referring to FIG. 10*a*, FIG. 10*a* is a schematic structural diagram of another mobile device according to an embodiment of the present invention. The mobile device shown in FIG. 10*a* may be configured to execute the system information obtaining method in a cell cluster disclosed in the embodiments of the present invention. As shown in FIG. 10*a*, the mobile device 1000 may include:

at least one processor 1001, for example, a CPU, at least one network interface 1002, a memory 1003, and at least one communications bus 1004. The communications bus 1004 is configured to implement connection and communication between the components. Optionally, the network interface 1002 may include an air interface in a 2G, 3G, 4G, or 5G network. The memory 1003 may be a high-speed RAM memory, or a non-volatile memory (non-volatile memory), such as at least one magnetic disk storage. Optionally, the memory 1003 may include at least one storage apparatus away from the processor 1001.

In this embodiment of the present invention, the memory 1003 is configured to store a program and data.

In this embodiment of the present invention, the processor 1001 is configured to invoke the program stored in the memory 1003, to perform the following operations:

obtaining, by using the network interface 1002, a first part of system information (for example, a special part of system information) needing to be used by any target cell in the cell cluster; and combining the first part of system information (for example, the special part of system information) and a second part of system information (for example, a general part of system information) that is prestored in the memory 1003, to obtain system information needing to be used by the target cell; or replacing a part that is in designated system information prestored in the memory 1003 and that corresponds to the first part of system information (for example, the special part of system information) with the first part of system information (for example, the special part of system information), to obtain system information needing to be used by the target cell.

In this embodiment of the present invention, the processor 1001 is further configured to invoke the program stored in the memory 1003, to perform the following operations:

receiving, by using the network interface 1002, the second part of system information (for example, the general part of system information) sent by a primary cell (for example, a macro cell), and storing the second part of system information into the memory 1003, where the cell cluster is in a coverage area of the primary cell (for example, the macro cell), and the second part of system information (for example, the general part of system information) is a same part of system information needing to be used by all cells in the cell cluster; or receiving, by using the network interface 1002, the designated system information sent by the primary cell (for example, the macro cell), and storing the designated system information into the memory 1003, where the designated system information includes the second part of system information (for example, the general part of system information) and a part that corresponds to the first part of system information (for example, the special part of system information) and that needs to be used by all cells in the cell cluster.

In an embodiment, a manner of obtaining, by the processor 1001 by using the network interface 1002, the first part of system information needing to be used by any target cell in the cell cluster is specifically:

obtaining, by using the network interface 1002 after the mobile device 1000 enters a coverage area of any target cell in the cell cluster, the first part of system information needing to be used by the target cell.

In an embodiment, a manner of obtaining, by the processor 1001 by using the network interface 1002 after the mobile device 1000 enters the coverage area of any target cell in the cell cluster, the first part of system information (for example, the special part of system information) needing to be used by the target cell may be specifically:

after the mobile device 1000 enters the coverage area of any target cell in the cell cluster, receiving, by using the network interface 1002, the first part of system information (for example, the special part of system information) that needs to be used by the target cell and that is sent by the target cell, where the first part of system information (for example, the special part of system information) needing to be used by the target cell is obtained by the target cell by deducting, after the target cell receives the second part of system information (for example, the general part of system information) sent by the primary cell (for example, the macro cell), the second part of system information (for example, the general part of system information) from the system information needing to be used by the target cell.

In another embodiment, a manner of obtaining, by the processor 1001 by using the network interface 1002 after the mobile device 1000 enters the coverage area of any target cell in the cell cluster, the first part of system information (for example, the special part of system information) needing to be used by the target cell may be specifically:

sending, by using the network interface 1002, a system information request to the primary cell (for example, the macro cell) after the mobile device 1000 enters the coverage area of any target cell in the cell cluster; and receiving, by using the network interface 1002, the first part of system information (for example, the special part of system information) that needs to be used by the target cell and that is sent by the primary cell (for example, the macro cell) in response to the system information request, where the first part of system information (for example, the special part of system information) needing to be used by the target cell is obtained by the target cell by deducting, after the target cell receives the second part of system information (for example, the general part of system information) sent by the primary cell (for example, the macro cell), the second part of system information (for example, the general part of system information) from the system information needing to be used by the target cell, and is sent to the primary cell (for example, the macro cell).

In still another embodiment, a manner of obtaining, by the processor 1001 by using the network interface 1002 after the mobile device 1000 enters the coverage area of any target cell in the cell cluster, the first part of system information (for example, the special part of system information) needing to be used by the target cell may be specifically:

after the mobile device 1000 enters the coverage area of any target cell in the cell cluster, receiving, by using the network interface 1002, the first part of system information (for example, the special part of system information) that needs to be used by the target cell and that is sent by the primary cell (for example, the macro cell) according to location information of the mobile device 1000, where the first part of system information (for example, the special part of system information) needing to be used by the target cell is obtained by the target cell by deducting, after the target cell receives the second part of system information (for example, the general part of system information) sent by the primary cell (for example, the macro cell), the second part of system information (for example, the general part of system information) from the system information needing to be used by the target cell, and is sent to the primary cell (for example, the macro cell).

It can be learned that, according to the mobile device described in FIG. 10*a*, the mobile device can consume relatively little power and time to obtain entire system information needing to be used by a target cell, thereby improving efficiency of obtaining, by the mobile device, entire system information, and reducing power consumption of the mobile device. In addition, according to the mobile device described in FIG. 10*a*, a cell does not need to periodically broadcast entire system information, thereby effectively reducing transmit power consumption of a network side device.

Figure 10B:
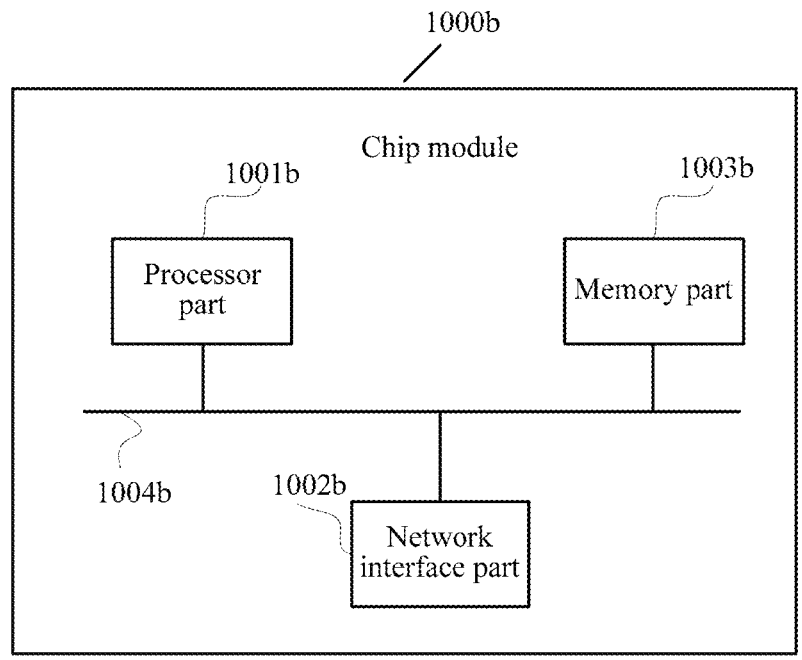
FIG. 10b is a schematic structural diagram of a chip module according to an embodiment of the present invention.

Referring to FIG. 10*b*, FIG. 10*b* is a schematic structural diagram of a chip module according to an embodiment of the present invention. The chip module shown in FIG. 10*b* may be built in a mobile device, and configured to execute the system information obtaining method in a cell cluster disclosed in the embodiments of the present invention. As shown in FIG. 10*b*, the chip module 1000*b* may include:

a processor part 1001*b*, a network interface part 1002*b*, and a memory part 1003*b*, where the processor part 1001*b*, the network interface part 1002*b*, and the memory part 1003*b* are interconnected by using a bus system 1004*b* in the chip module 1000*b*, the memory part 1003*b* is configured to store a program and information, and the processor part 1001*b* is configured to invoke the program stored in the memory part 1003*b*, to perform the following operations:

obtaining, by using the network interface part 1002*b*, a first part of system information needing to be used by any target cell in the cell cluster; and combining the first part of system information and a second part of system information that is prestored in the memory part 1003*b*, to obtain system information needing to be used by the target cell, or replacing a part that is in designated system information prestored in the memory part 1003*b* and that corresponds to the first part of system information with the first part of system information, and using updated designated system information prestored in the memory part 1003*b* as system information needing to be used by the target cell.

In an embodiment, the processor part 1001*b* is further configured to invoke the program stored in the memory part 1003*b*, to perform the following operations:

receiving, by using the network interface part 1002*b*, the second part of system information sent by a primary cell, and storing the second part of system information into the memory part 1003*b*, where the cell cluster is in a coverage area of the primary cell, and the second part of system information is a same part of system information needing to be used by all cells in the cell cluster; or receiving, by using the network interface part 1002*b*, the designated system information sent by a primary cell, and storing the designated system information into the memory part 1003*b*, where the designated system information includes the second part of system information and the part that corresponds to the first part of system information and that needs to be used by all cells in the cell cluster.

In an embodiment, a manner of obtaining, by the processor part 1001*b* by using the network interface part 1002*b*, the first part of system information needing to be used by any target cell in the cell cluster is specifically:

obtaining, by the processor part 1001*b* by using the network interface part 1002*b* after the mobile device 1000*b* enters the coverage area of any target cell in the cell cluster, the first part of system information needing to be used by the target cell.

In an embodiment, a manner of obtaining, by the processor part 1001*b* by using the network interface part 1002*b* after the mobile device 1000*b* enters the coverage area of any target cell in the cell cluster, the first part of system information needing to be used by the target cell is specifically:

receiving, by using the network interface part 1002*b* after the mobile device 1000*b* enters the coverage area of any target cell in the cell cluster, the first part of system information that needs to be used by the target cell and that is sent by the target cell, where the first part of system information needing to be used by the target cell is obtained by the target cell by deducting, after the target cell receives the second part of system information sent by the primary cell, the second part of system information from the system information needing to be used by the target cell.

In another embodiment, a manner of obtaining, by the processor part 1001*b* by using the network interface part 1002*b* after the mobile device 1000*b* enters the coverage area of any target cell in the cell cluster, the first part of system information needing to be used by the target cell is specifically:

after the mobile device 1000*b* enters the coverage area of any target cell in the cell cluster, sending, by using the network interface part 1002*b*, a system information request to the primary cell, and receiving, by using the network interface part 1002*b*, the first part of system information that needs to be used by the target cell and that is sent by the primary cell in response to the system information request, where the first part of system information needing to be used by the target cell is obtained by the target cell by deducting, after the target cell receives the second part of system information sent by the primary cell, the second part of system information from the system information needing to be used by the target cell, and is sent to the primary cell.

In another embodiment, a manner of obtaining, by the processor part 1001*b* by using the network interface part 1002*b* after the mobile device 1000*b* enters the coverage area of any target cell in the cell cluster, the first part of system information needing to be used by the target cell is specifically:

receiving, by using the network interface part 1002*b* after the mobile device 1000*b* enters the coverage area of any target cell in the cell cluster, the first part of system information that needs to be used by the target cell and that is sent by the primary cell according to location information of the mobile device 1000*b*, where the first part of system information needing to be used by the target cell is obtained by the target cell by deducting, after the target cell receives the second part of system information sent by the primary cell, the second part of system information from the system information needing to be used by the target cell, and is sent to the primary cell.

It can be learned that, according to the mobile device described in FIG. 10*b*, the mobile device can consume relatively little power and time to obtain entire system information needing to be used by a target cell, thereby improving efficiency of obtaining, by the mobile device, entire system information, and reducing power consumption of the mobile device. In addition, according to the mobile device described in FIG. 10*b*, a cell does not need to periodically broadcast entire system information, thereby effectively reducing transmit power consumption of a network side device.

Figure 11:
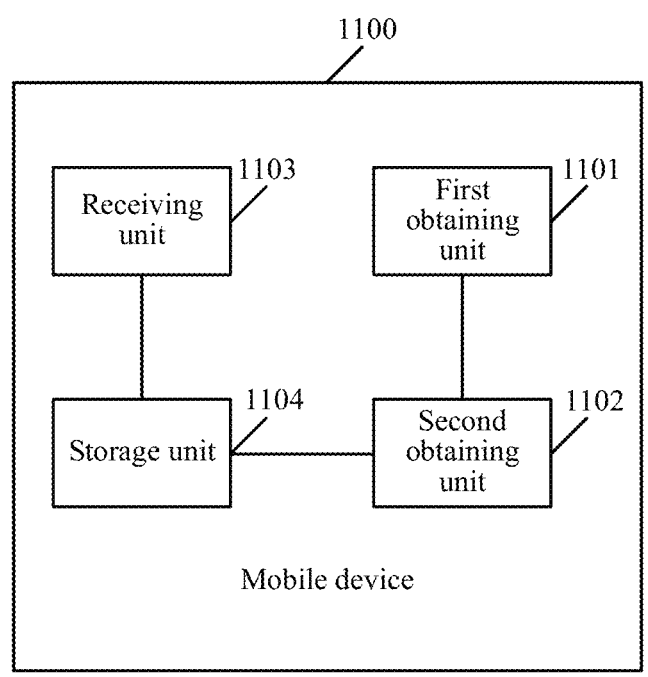
FIG. 11 is a schematic structural diagram of another mobile device according to an embodiment of the present invention.

Referring to FIG. 11, FIG. 11 is a schematic structural diagram of another mobile device according to an embodiment of the present invention. The mobile device shown in FIG. 11 may be configured to execute the system information obtaining method in a cell cluster disclosed in the embodiments of the present invention. As shown in FIG. 11, the mobile device 1100 may include:

a first obtaining unit 1101, configured to obtain an index number corresponding to system information needing to be used by any target cell in the cell cluster; and a second obtaining unit 1102, configured to obtain, from at least one set of system information prestored in the mobile device 1100 based on the index number, the system information needing to be used by the target cell, where the system information needing to be used by the target cell has the index number.

In an embodiment, the mobile device 1100 in FIG. 11 further includes:

a receiving unit 1103, configured receive the at least one set of system information sent by a primary cell (for example, a macro cell), where each set of the system information has a corresponding index number, the cell cluster is in a coverage area of the primary cell (for example, the macro cell), and each set of the system information corresponds to one cell in the cell cluster; and a storage unit 1104, configured to store the at least one set of system information.

In an embodiment, the first obtaining unit 1101 is specifically configured to: after the mobile device 1100 enters a coverage area of any target cell in the cell cluster, obtain the index number corresponding to the system information needing to be used by the target cell.

In an embodiment, the first obtaining unit 1101 is specifically configured to: after the mobile device 1100 enters the coverage area of any target cell in the cell cluster, receive the index number that corresponds to the system information needing to be used by the target cell and that is sent by the target cell on an air interface.

In another embodiment, the first obtaining unit 1101 is specifically configured to: after the mobile device 1100 enters the coverage area of any target cell in the cell cluster, receive a first indication message sent by the primary cell (for example, the macro cell), where the first indication message is used to instruct to start index number receiving; and receive, in response to the first indication message, the index number that corresponds to the system information needing to be used by the target cell and that is sent by the target cell on the air interface.

In this embodiment of the present invention, the index number corresponding to the system information needing to be used by the target cell is sent by the target cell after the target cell receives a second indication message sent by the primary cell (for example, the macro cell), where the second indication message is sent by the primary cell (for example, the macro cell) to the target cell after the primary cell detects that the mobile device 1100 enters the coverage area of the target cell, and the second indication message is used to instruct to start index number sending.

It can be learned that, according to the mobile device described in FIG. 11, by using extremely little power and time, entire system information needing to be used by a target cell can be obtained from at least one set of prestored system information based on an index number, thereby improving efficiency of obtaining, by the mobile device, entire system information, and reducing power consumption of the mobile device.

Figure 12A:
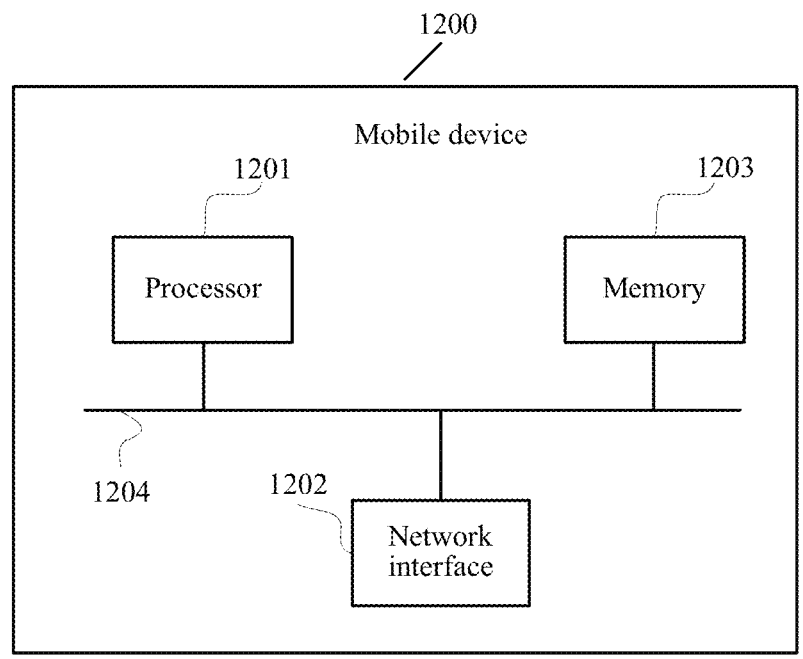
FIG. 12a is a schematic structural diagram of another mobile device according to an embodiment of the present invention.

Referring to FIG. 12a, FIG. 12a is a schematic structural diagram of another mobile device according to an embodiment of the present invention. The mobile device shown in FIG. 12a may be configured to execute the system information obtaining method in a cell cluster disclosed in the embodiments of the present invention. As shown in FIG. 12a, the mobile device 1200 may include:

at least one processor 1201, for example, a CPU, at least one network interface 1202, a memory 1203, and at least one communications bus 1204. The communications bus 1204 is configured to implement connection and communication between the components. Optionally, the network interface 1202 may include an air interface in a 2G, 3G, 4G, or 5G network. The memory 1203 may be a high-speed RAM memory, or a non-volatile memory (non-volatile memory), such as at least one magnetic disk storage. Optionally, the memory 1203 may include at least one storage apparatus away from the processor 1201, or the memory 1203 may be physically integrated with the processor 1201.

In this embodiment of the present invention, the memory 1203 is configured to store a program and data.

In this embodiment of the present invention, the processor 1201 is configured to invoke the program stored in the memory 1203, to perform the following operations:

obtaining, by using the network interface 1202, an index number corresponding to system information needing to be used by any target cell in the cell cluster; and obtaining, from at least one set of system information prestored in the memory 1203 based on the index number, the system information needing to be used by the target cell, where the system information needing to be used by the target cell has the index number.

In an embodiment, the processor 1201 is further configured to invoke the program stored in the memory 1203, to perform the following operations:

receiving, by using the network interface 1202, the at least one set of system information sent by a primary cell (for example, a macro cell) and storing the at least one set of system information into the memory 1203, where each set of the system information has a corresponding index number, the cell cluster is in a coverage area of the primary cell (for example, the macro cell), and each set of the system information corresponds to one cell in the cell cluster.

In an embodiment, the processor 1201 may obtain, by using the network interface 1202 after the mobile device 1200 enters a coverage area of any target cell in the cell cluster, the index number corresponding to the system information needing to be used by the target cell.

In an embodiment, a manner of obtaining, by the processor 1201 by using the network interface 1202 after the mobile device 1200 enters the coverage area of any target cell in the cell cluster, the index number corresponding to the system information needing to be used by the target cell is specifically:

receiving, by the processor 1201 by using the network interface 1202 after the mobile device 1200 enters the coverage area of any target cell in the cell cluster, the index number that corresponds to the system information needing to be used by the target cell and that is sent by the target cell on an air interface.

In another embodiment, a manner of obtaining, by the processor 1201 by using the network interface 1202 after the mobile device 1200 enters the coverage area of any target cell in the cell cluster, the index number corresponding to the system information needing to be used by the target cell is specifically:

after the mobile device 1200 enters the coverage area of any target cell in the cell cluster, receiving, by the processor 1201 by using the network interface 1202, a first indication message sent by the primary cell (for example, the macro cell), where the first indication message is used to instruct to start index number receiving; and receiving, by using the network interface 1202 in response to the first indication message, the index number that corresponds to the system information needing to be used by the target cell and that is sent by the target cell on the air interface.

In this embodiment of the present invention, the index number corresponding to the system information needing to be used by the target cell is sent by the target cell after the target cell receives a second indication message sent by the primary cell (for example, the macro cell), where the second indication message is sent by the primary cell (for example, the macro cell) to the target cell after the primary cell detects that the mobile device 1200 enters the coverage area of the target cell, and the second indication message is used to instruct to start index number sending.

It can be learned that, according to the mobile device described in FIG. 12a, by using extremely little power and time, entire system information needing to be used by a target cell can be obtained from at least one set of prestored system information based on an index number, thereby improving efficiency of obtaining, by the mobile device, entire system information, and reducing power consumption of the mobile device.

Figure 12B:
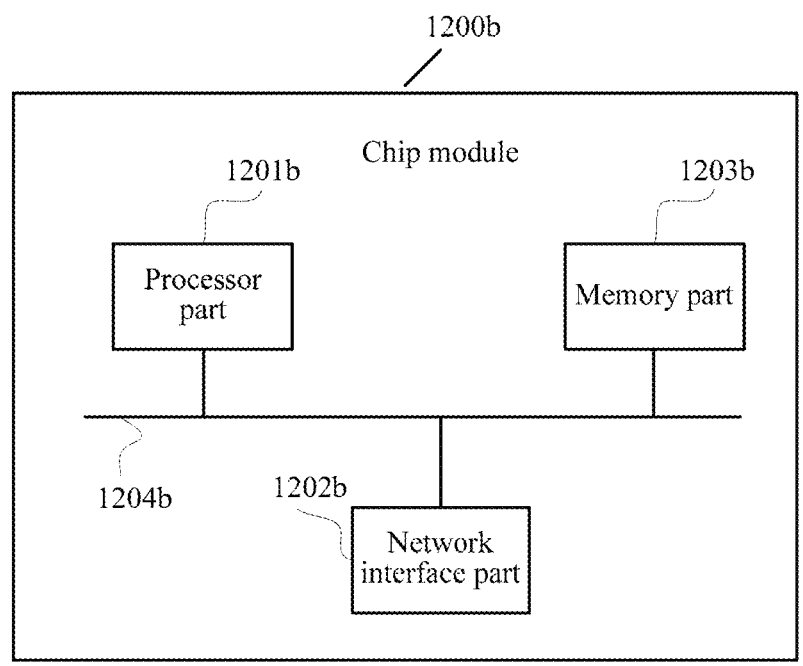
FIG. 12b is a schematic structural diagram of another chip module according to an embodiment of the present invention.

Referring to FIG. 12b, FIG. 12b is a schematic structural diagram of another chip module according to an embodiment of the present invention. The chip module shown in FIG. 12b may be built in a mobile device, and configured to execute the system information obtaining method in a cell cluster disclosed in the embodiments of the present invention. As shown in FIG. 12b, the chip module 1200b may include:

a processor part 1201b, a network interface part 1202b, and a memory part 1203b, where the processor part 1201b, the network interface part 1202b, and the memory part 1203b are interconnected by using a bus system 1204b in the chip module 1200b, the memory part 1203b is configured to store a program and information, and the processor part 1201b is configured to invoke the program stored in the memory part 1203b, to perform the following operations:

obtaining, by using the network interface part 1202b, an index number corresponding to system information needing to be used by any target cell in the cell cluster; and obtaining, from at least one set of system information prestored in the memory part 1203b based on the index number, the system information needing to be used by the target cell, where the system information needing to be used by the target cell has the index number.

In an embodiment, the processor part 1201b is further configured to invoke the program stored in the memory part 1203b, to perform the following operations:

receiving, by using the network interface part 1202b, the at least one set of system information sent by a primary cell, and storing the at least one set of system information into the memory part 1203b, where each set of the system information has a corresponding index number, the cell cluster is in a coverage area of the primary cell, and each set of the system information corresponds to one cell in the cell cluster.

In an embodiment, a manner of obtaining, by the processor part 1201b by using the network interface part 1202b, the index number corresponding to the system information needing to be used by any target cell in the cell cluster is specifically:

obtaining, by using the network interface part 1202b after the mobile device 1200b enters a coverage area of any target cell in the cell cluster, the index number corresponding to the system information needing to be used by the target cell.

In an embodiment, a manner of obtaining, by the processor part 1201b by using the network interface part 1202b after the mobile device 1200b enters the coverage area of any target cell in the cell cluster, the index number corresponding to the system information needing to be used by the target cell is specifically:

receiving, by using the network interface part 1202b after the mobile device 1200b enters the coverage area of any target cell in the cell cluster, the index number that corresponds to the system information needing to be used by the target cell and that is sent by the target cell on an air interface.

In an embodiment, a manner of obtaining, by the processor part 1201b by using the network interface part 1202b after the mobile device 1200b enters the coverage area of any target cell in the cell cluster, the index number corresponding to the system information needing to be used by the target cell is specifically:

after the mobile device 1200b enters the coverage area of any target cell in the cell cluster, receiving, by using the network interface part 1202b, a first indication message sent by the primary cell, where the first indication message is used to instruct to start index number receiving, and receiving, by using the network interface part 1202b in response to the first indication message, the index number that corresponds to the system information needing to be used by the target cell and that is sent by the target cell on an air interface.

In this embodiment of the present invention, the index number corresponding to the system information needing to be used by the target cell is sent by the target cell after the target cell receives a second indication message sent by the primary cell, where the second indication message is sent by the primary cell to the target cell after the primary cell detects that the mobile device 1200b enters the coverage area of the target cell, and the second indication message is used to instruct to start index number sending.

It can be learned that, according to the mobile device described in FIG. 12b, by using extremely little power and time, entire system information needing to be used by a target cell can be obtained from at least one set of prestored system information based on an index number, thereby improving efficiency of obtaining, by the mobile device, entire system information, and reducing power consumption of the mobile device.

Figure 13:
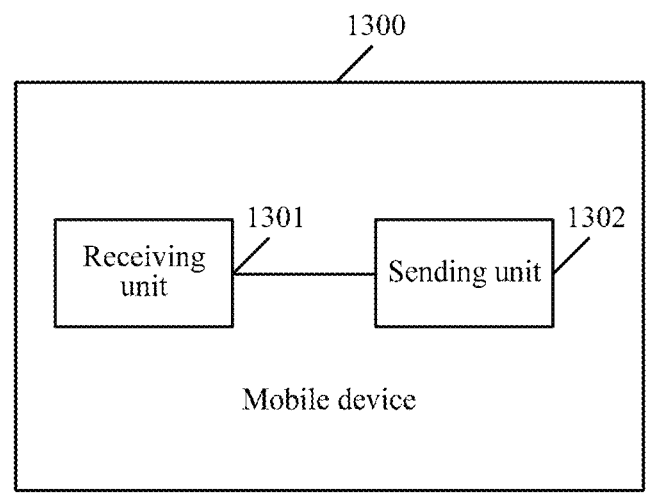
FIG. 13 is a schematic structural diagram of another mobile device according to an embodiment of the present invention.

Referring to FIG. 13, FIG. 13 is a schematic structural diagram of another mobile device according to an embodiment of the present invention. The mobile device shown in FIG. 13 may be configured to execute the system information obtaining method in a cell cluster disclosed in the embodiments of the present invention. As shown in FIG. 13, the mobile device 1300 may include:

a receiving unit 1301, configured to receive a notification message sent by a primary cell (for example, a macro cell), where the notification message is used to instruct the mobile device 1300 to request system information from any target cell in the cell cluster, and the cell cluster is in a coverage area of the primary cell; and a sending unit 1302, configured to send a system information obtaining request to the target cell in response to the notification message, where the receiving unit 1301 is further configured to receive the system information sent by the target cell.

It can be learned that, according to the mobile device described in FIG. 13, a target cell sends system information to the mobile device only when receiving a system information obtaining request sent by the mobile device. That is, if the mobile device does not send the system information request, the target cell does not send the system information. Compared with that a cell periodically broadcasts entire system information, this embodiment of the present invention can effectively reduce transmit power consumption of a network side device.

Figure 14A:
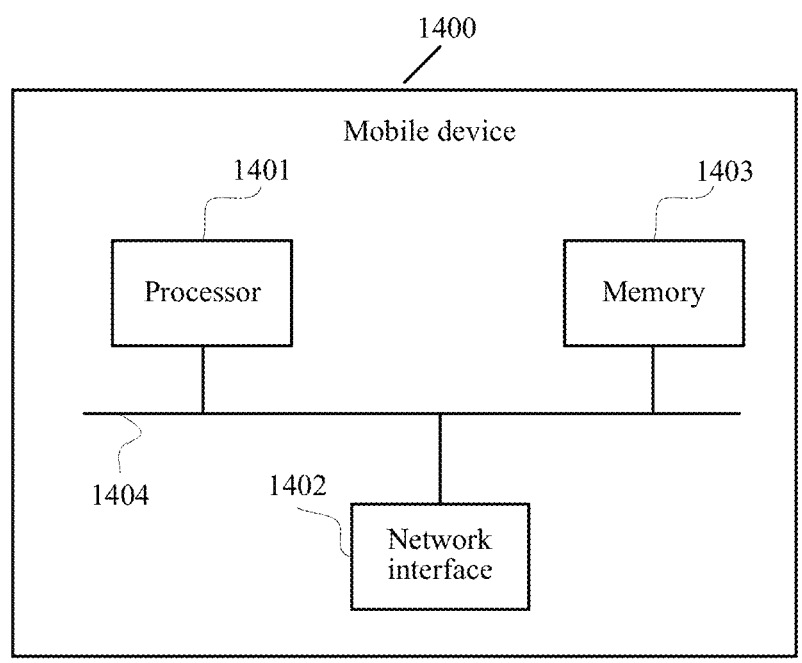
FIG. 14a is a schematic structural diagram of another mobile device according to an embodiment of the present invention.

Referring to FIG. 14a, FIG. 14a is a schematic structural diagram of another mobile device according to an embodiment of the present invention. The mobile device shown in FIG. 14a may be configured to execute the system information obtaining method in a cell cluster disclosed in the embodiments of the present invention. As shown in FIG. 14a, the mobile device 1400 may include:

at least one processor 1401, for example, a CPU, at least one network interface 1402, a memory 1403, and at least one communications bus 1404. The communications bus 1404 is configured to implement connection and communication between the components. Optionally, the network interface 1402 may include an air interface in a 2G, 3G, 4G, or 5G network. The memory 1403 may be a high-speed RAM memory, or a non-volatile memory (non-volatile memory), such as at least one magnetic disk storage. Optionally, the memory 1403 may include at least one storage apparatus away from the processor 1401.

In this embodiment of the present invention, the memory 1403 is configured to store a program and data.

In this embodiment of the present invention, the processor 1401 is configured to invoke the program stored in the memory 1403, to perform the following operations:

receiving, by using the network interface 1402, a notification message sent by a primary cell (for example, a macro cell), where the notification message is used to instruct the mobile device 1400 to request system information from any target cell in the cell cluster, and the cell cluster is in a coverage area of the primary cell;

sending, by using the network interface 1402, a system information obtaining request to the target cell in response to the notification message; and receiving, by using the network interface 1402, the system information sent by the target cell.

Further, the processor 1401 may receive the system information sent by the target cell and store the system information into the memory 1403.

It can be learned that, according to the mobile device described in FIG. 14*a*, a target cell sends system information to the mobile device only when receiving a system information obtaining request sent by the mobile device. That is, if the mobile device does not send the system information request, the target cell does not send the system information. Compared with that a cell periodically broadcasts entire system information, this embodiment of the present invention can effectively reduce transmit power consumption of a network side device.

Figure 14B:
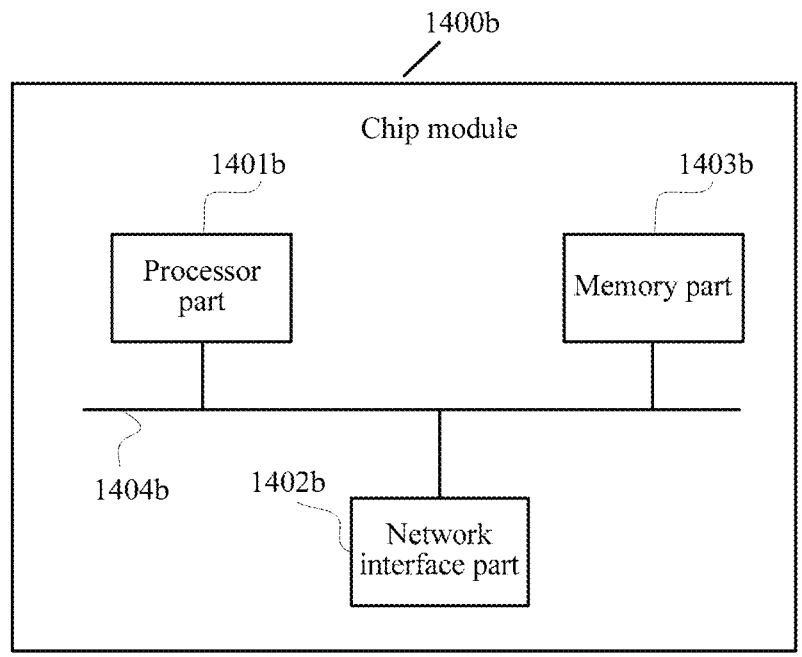
FIG. 14b is a schematic structural diagram of another chip module according to an embodiment of the present invention.

Referring to FIG. 14*b*, FIG. 14*b* is a schematic structural diagram of another chip module according to an embodiment of the present invention. The chip module shown in FIG. 14*b* may be built in a mobile device, and configured to execute the system information obtaining method in a cell cluster disclosed in the embodiments of the present invention. As shown in FIG. 14*b*, the chip module 1400*b* may include:

a processor part 1401*b*, a network interface part 1402*b*, and a memory part 1403*b*, where the processor part 1401*b*, the network interface part 1402*b*, and the memory part 1403*b* are interconnected by using a bus system 1404*b* in the chip module 1400*b*, the memory part 1403*b* is configured to store a program and information, and the processor part 1401*b* is configured to invoke the program stored in the memory part 1403*b*, to perform the following operations:

receiving, by using the network interface part 1402*b*, a notification message sent by a primary cell, where the notification message is used to instruct the mobile device 1400*b* to request system information from any target cell in the cell cluster, and the cell cluster is in a coverage area of the primary cell;

sending, by using the network interface part 1402*b*, a system information obtaining request to the target cell in response to the notification message; and receiving, by using the network interface part 1402*b*, the system information sent by the target cell.

Further, the processor part 1401*b* may receive the system information sent by the target cell and store the system information into the memory part 1403*b*.

It can be learned that, according to the mobile device described in FIG. 14*b*, a target cell sends system information to the mobile device only when receiving a system information obtaining request sent by the mobile device. That is, if the mobile device does not send the system information request, the target cell does not send the system information. Compared with that a cell periodically broadcasts entire system information, this embodiment of the present invention can effectively reduce transmit power consumption of a network side device.

Figure 15:
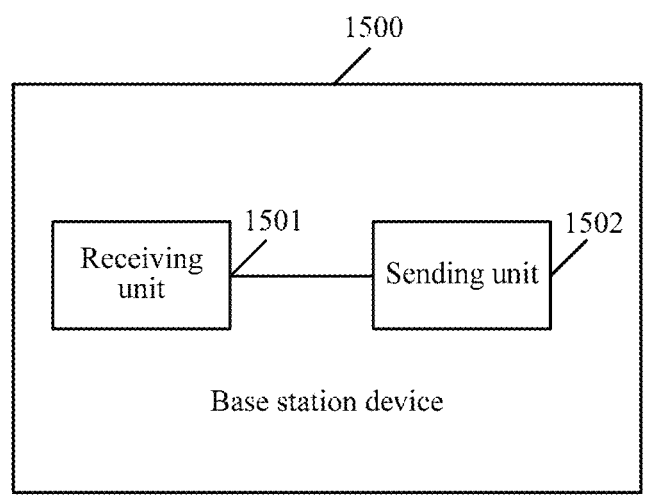
FIG. 15 is a schematic structural diagram of a base station device according to an embodiment of the present invention.

Referring to FIG. 15, FIG. 15 is a schematic structural diagram of a base station device according to an embodiment of the present invention. The base station device shown in FIG. 15 may be configured to execute the system information obtaining method in a cell cluster disclosed in the embodiments of the present invention. As shown in FIG. 15, the base station device 1500 may include:

a receiving unit 1501, configured to receive a system information request that is sent by a mobile device for any target cell in the cell cluster; and a sending unit 1502, configured to send a first part of system information needing to be used by the target cell to the mobile device in response to the system information request, so that the mobile device combines the first part of system information and a second part of system information that is prestored in the mobile device, to obtain system information needing to be used by the target cell; or the mobile device replaces a part that is in prestored designated system information and that corresponds to the first part of system information with the first part of system information, and uses updated designated system information as system information needing to be used by the target cell.

In an embodiment, the sending unit 1501 is further configured to send the second part of system information to the mobile device, where the second part of system information is a same part of system information needing to be used by all cells in the cell cluster; or the sending unit 1501 is further configured to send the designated system information to the mobile device, where the designated system information includes the second part of system information and the part that corresponds to the first part of system information and that needs to be used by all cells in the cell cluster.

It can be learned that, according to the base station device described in FIG. 15, efficiency of obtaining, by a mobile device, entire system information can be improved, and power consumption of the mobile device can be reduced.

Figure 16:
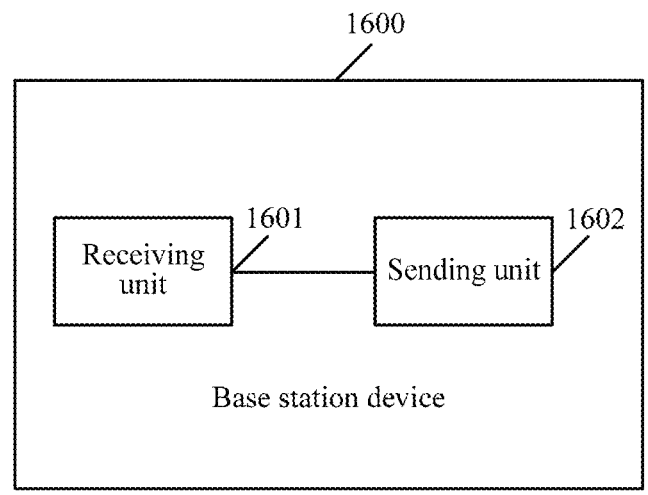
FIG. 16 is a schematic structural diagram of another base station device according to an embodiment of the present invention.

Referring to FIG. 16, FIG. 16 is a schematic structural diagram of another base station device according to an embodiment of the present invention. The base station device shown in FIG. 16 may be configured to execute the system information obtaining method in a cell cluster disclosed in the embodiments of the present invention. As shown in FIG. 16, the base station device 1600 may include:

a receiving unit 1601, configured to receive a system information obtaining request sent by a mobile device, where the system information obtaining request is sent by the mobile device in response after the mobile device receives a notification message sent by a primary cell, the notification message is used to instruct the mobile device to request system information from any target cell in the cell cluster, and the cell cluster is in a coverage area of the primary cell; and a sending unit 1602, configured to send the system information of the target cell to the mobile device in response to the system information obtaining request.

It can be learned that, according to the base station device described in FIG. 16, transmit power consumption of a network side device can be reduced.

Figure 17:
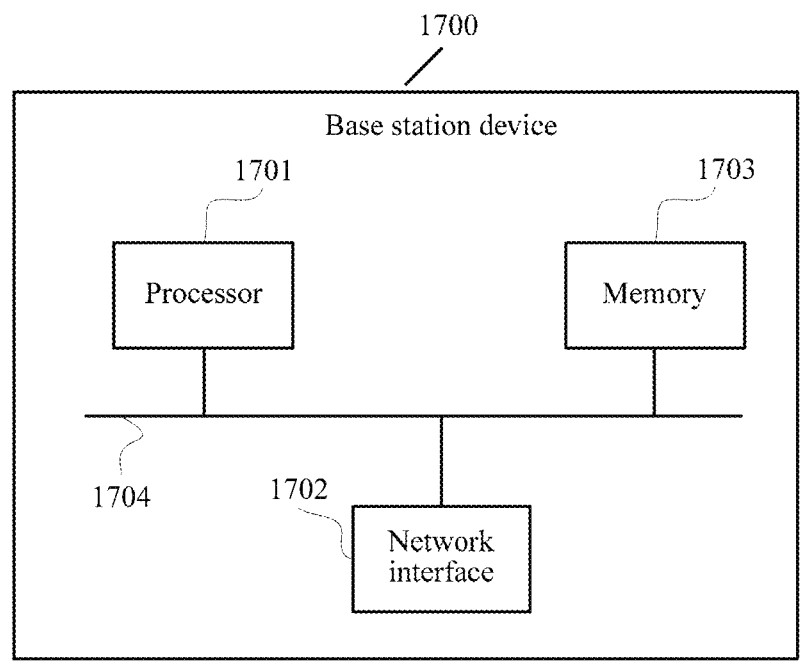
FIG. 17 is a schematic structural diagram of another base station device according to an embodiment of the present invention.

Referring to FIG. 17, FIG. 17 is a schematic structural diagram of another base station device according to an embodiment of the present invention. The base station device shown in FIG. 17 may be configured to execute the system information obtaining method in a cell cluster disclosed in the embodiments of the present invention. As shown in FIG. 17, the base station device 1700 may include:

at least one processor 1701, a network interface 1702, and a memory 1703, where the at least one processor 1701, the network interface 1702, and the memory 1703 are interconnected by using a bus system 1704 in the base station device 1700, the memory 1703 is configured to store a program and information, and the processor 1701 is configured to invoke the program stored in the memory 1703, to perform the following operations:

receiving, by using the network interface 1702, a system information request that is sent by a mobile device for any target cell in the cell cluster; and sending, by using the network interface 1702, a first part of system information needing to be used by the target cell to the mobile device in response to the system information request, so that the mobile device combines the first part of system information and a second part of system information that is prestored in the mobile device, to obtain system information needing to be used by the target cell; or the mobile device replaces a part that is in prestored designated system information and that corresponds to the first part of system information with the first part of system information, and uses updated designated system information as system information needing to be used by the target cell.

In an embodiment, the processor 1701 is further configured to invoke the program stored in the memory 1703, to perform the following operations:

sending, by using the network interface 1702, the second part of system information prestored in the memory 1703 to the mobile device, where the second part of system information is a same part of system information needing to be used by all cells in the cell cluster; or sending, by using the network interface 1702, the designated system information prestored in the memory 1703 to the mobile device, where the designated system information includes the second part of system information and the part that corresponds to the first part of system information and that needs to be used by all cells in the cell cluster.

It can be learned that, according to the base station device described in FIG. 17, transmit power consumption of a cell can be reduced.

Figure 18:
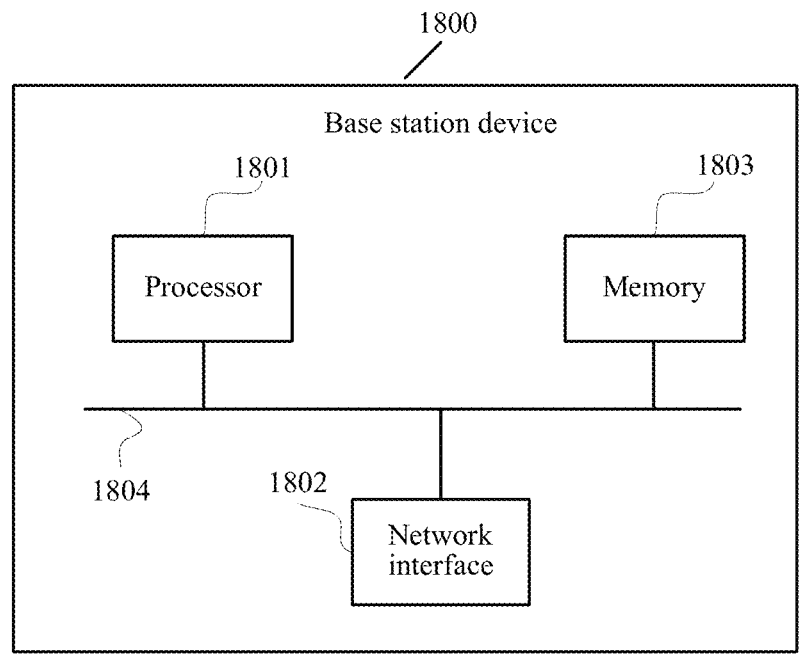
FIG. 18 is a schematic structural diagram of another base station device according to an embodiment of the present invention.

Referring to FIG. 18, FIG. 18 is a schematic structural diagram of another base station device according to an embodiment of the present invention. The base station device shown in FIG. 18 may be configured to execute the system information obtaining method in a cell cluster disclosed in the embodiments of the present invention. As shown in FIG. 18, the base station device 1800 may include:

at least one processor 1801, a network interface 1802, and a memory 1803, where the at least one processor 1801, the network interface 1802, and the memory 1803 are interconnected by using a bus system 1804 in the base station device 1800, the memory 1803 is configured to store a program and information, and the processor 1801 is configured to invoke the program stored in the memory 1803, to perform the following operations:

receiving, by using the network interface 1802, a system information obtaining request sent by a mobile device, where the system information obtaining request is sent by the mobile device in response after the mobile device receives a notification message sent by a primary cell, the notification message is used to instruct the mobile device to request system information from any target cell in the cell cluster, and the cell cluster is in a coverage area of the primary cell; and sending, by using the network interface 1802, the system information of the target cell prestored in the memory 1803 to the mobile device in response to the system information obtaining request.

In this embodiment of the present invention, the base station device shown in FIG. 18 may be a base station device of the target cell, and this is not limited in this embodiment of the present invention.

It can be learned that, according to the base station device described in FIG. 18, transmit power consumption of a network side device can be reduced.

Figure 19:
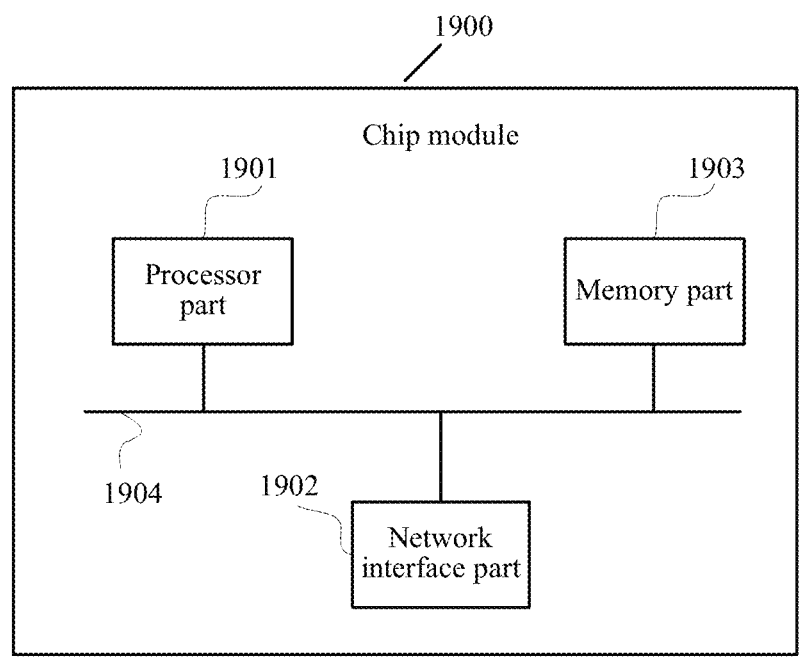
FIG. 19 is a schematic structural diagram of another chip module according to an embodiment of the present invention.

Referring to FIG. 19, FIG. 19 is a schematic structural diagram of another chip module according to an embodiment of the present invention. The chip module shown in FIG. 19 may be built in a base station device, and configured to execute the system information obtaining method in a cell cluster disclosed in the embodiments of the present invention. As shown in FIG. 19, the chip module 1900 includes:

a processor part 1901, a network interface part 1902, and a memory part 1903, where the processor part 1901, the network interface part 1902, and the memory part 1903 are interconnected by using a bus system 1904 in the chip module 1900, the memory part 1903 is configured to store a program and information, and the processor part 1901 is configured to invoke the program stored in the memory part 1903, to perform the following operations:

receiving, by using the network interface part 1902, a system information request that is sent by a mobile device for any target cell in the cell cluster; and sending, by using the network interface part 1902, a first part of system information needing to be used by the target cell to the mobile device in response to the system information request, so that the mobile device combines the first part of system information and a second part of system information that is prestored in the mobile device, to obtain system information needing to be used by the target cell; or the mobile device replaces a part that is in prestored designated system information and that corresponds to the first part of system information with the first part of system information, and uses updated designated system information as system information needing to be used by the target cell.

In an embodiment, the processor part 1901 is further configured to invoke the program stored in the memory part 1903, to perform the following operations:

sending, by using the network interface part 1902, the second part of system information prestored in the memory part 1903 to the mobile device, where the second part of system information is a same part of system information needing to be used by all cells in the cell cluster; or sending, by using the network interface part 1902, the designated system information prestored in the memory part 1903 to the mobile device, where the designated system information includes the second part of system information and the part that corresponds to the first part of system information and that needs to be used by all cells in the cell cluster.

It can be learned that, according to the chip module described in FIG. 19, by using extremely little power and time, entire system information needing to be used by a target cell can be obtained, thereby improving efficiency of obtaining, by a mobile device, entire system information, and reducing power consumption of the mobile device. In addition, according to the chip module described in FIG. 19, transmit power consumption of a network side device can be reduced.

Figure 20:
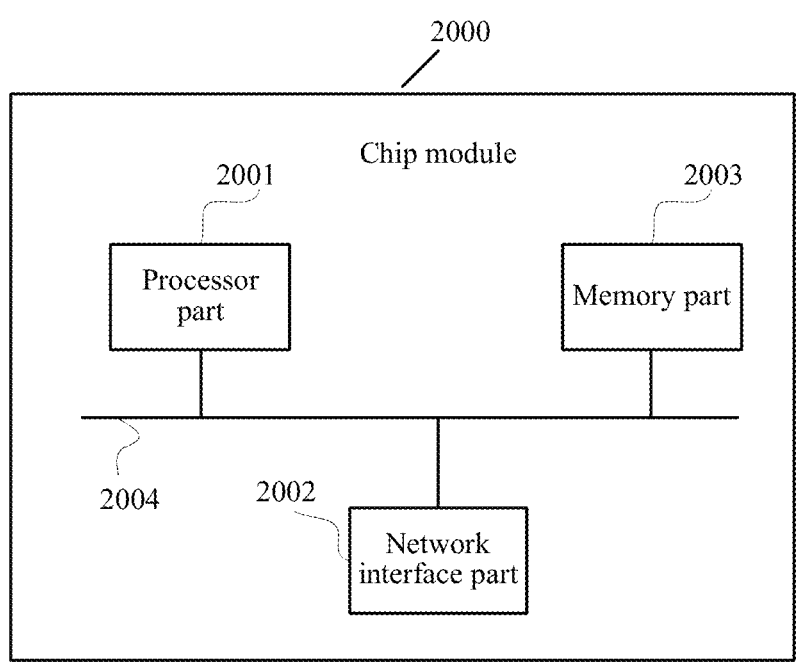
FIG. 20 is a schematic structural diagram of another chip module according to an embodiment of the present invention.

Referring to FIG. 20, FIG. 20 is a schematic structural diagram of another chip module according to an embodiment of the present invention. The chip module shown in FIG. 20 may be built in a base station device, and configured to execute the system information obtaining method in a cell cluster disclosed in the embodiments of the present invention. As shown in FIG. 20, the chip module 2000 includes:

a processor part 2001, a network interface part 2002, and a memory part 2003, where the processor part 2001, the network interface part 2002, and the memory part 2003 are interconnected by using a bus system 2004 in the chip module 2000, the memory part 2003 is configured to store a program and information, and the processor part 2001 is configured to invoke the program stored in the memory part 2003, to perform the following operations:

receiving, by using the network interface part 2002, a system information obtaining request sent by a mobile device, where the system information obtaining request is sent by the mobile device in response after the mobile device receives a notification message sent by a primary cell, the notification message is used to instruct the mobile device to request system information from any target cell in the cell cluster, and the cell cluster is in a coverage area of the primary cell; and sending, by using the network interface part 2002, the system information of the target cell prestored in the memory part 2003 to the mobile device in response to the system information obtaining request.

It can be learned that, according to the chip module described in FIG. 20, transmit power consumption of a cell can be reduced.

Figure 21:
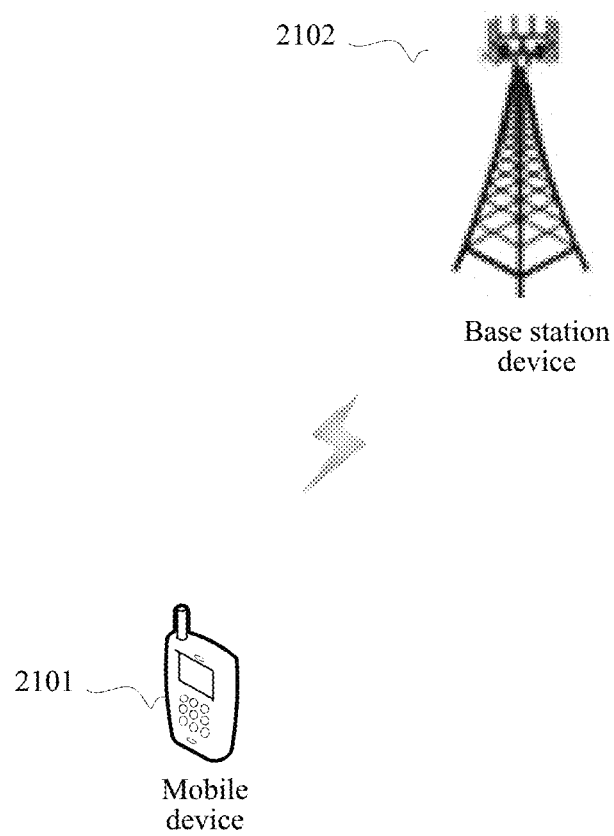
FIG. 21 is a schematic diagram of a system information obtaining system in a cell cluster according to an embodiment of the present invention.

Referring to FIG. 21, FIG. 21 is a schematic diagram of a system information obtaining system in a cell cluster according to an embodiment of the present invention. The system information obtaining system in a cell cluster in FIG. 21 is configured to execute the system information obtaining method in a cell cluster disclosed in the embodiments of the present invention. As shown in FIG. 21, the system information obtaining system in a cell cluster may include:

a mobile device 2101 and a base station device 2102, where the mobile device 2101 and the base station device 2102 are connected by using a wireless network;

the mobile device 2101 is configured to send a system information request for any target cell in the cell cluster to the base station device 2102;

the base station device 2102 is configured to: receive the system information request sent by the mobile device 2101, and send a first part of system information needing to be used by the target cell to the mobile device 2101 in response to the system information request; and the mobile device 2101 is further configured to: receive the first part of system information that needs to be used by the target cell and that is sent by the base station device 2102; and combine the first part of system information and a second part of system information that is prestored in the mobile device 2101, to obtain system information needing to be used by the target cell; or replace a part that is in prestored designated system information and that corresponds to the first part of system information with the first part of system information, and use updated designated system information as system information needing to be used by the target cell.

In an embodiment, the base station device 2102 is further configured to send the second part of system information to the mobile device 2101, where the second part of system information is a same part of system information needing to be used by all cells in the cell cluster; or send the designated system information to the mobile device 2101, where the designated system information includes the second part of system information and the part that corresponds to the first part of system information and that needs to be used by all cells in the cell cluster.

In an embodiment, the base station device 2102 may be a base station device of a primary cell (for example, a macro cell), and the cell cluster may be in a coverage area of the primary cell.

It can be learned that, according to the system described in FIG. 21, by using extremely little power and time, entire system information needing to be used by a target cell can be obtained, thereby improving efficiency of obtaining, by a mobile device, entire system information, and reducing power consumption of the mobile device. In addition, according to the chip module described in FIG. 19, transmit power consumption of a network side device can be reduced.

Figure 22:
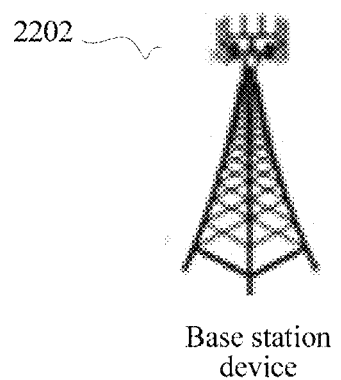
FIG. 22 is a schematic diagram of another system information obtaining system in a cell cluster according to an embodiment of the present invention.
Figure 22:

Referring to FIG. 22, FIG. 22 is a schematic diagram of another system information obtaining system in a cell cluster according to an embodiment of the present invention. The system information obtaining system in a cell cluster in FIG. 22 is configured to execute the system information obtaining method in a cell cluster disclosed in the embodiments of the present invention. As shown in FIG. 22, the system information obtaining system in a cell cluster may include:

a mobile device 2201 and a base station device 2202, where the mobile device 2201 and the base station device 2202 are connected by using a wireless network;

the mobile device 2201 is configured to: receive a notification message sent by a primary cell, and send a system information obtaining request to the base station device in response to the notification message, where the notification message is used to instruct the mobile device 2201 to request system information from any target cell in the cell cluster, and the cell cluster is in a coverage area of the primary cell; and the base station device 2202 is configured to: receive the system information obtaining request sent by the mobile device, and send the system information of the target cell to the mobile device 2201 in response to the system information obtaining request.

In this embodiment of the present invention, the base station device 2202 may be a base station device of the target cell, and this is not limited in this embodiment of the present invention.

It can be learned that, according to the system described in FIG. 22, transmit power consumption of a network side device can be reduced.

It should be noted that, in this embodiment of the present invention, actions or functions executed by the primary cell and the target cell usually should be understood as actions or functions executed by the base station device of the primary cell and the base station device of the target cell, and details are not described in this embodiment of the present invention.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing describes in detail the system information obtaining method in a cell cluster, the related device, and the system that are disclosed in the embodiments of the present invention. In this specification, specific examples are used to describe the principle and implementations of the present invention, and the description of the embodiments is only intended to help understand the method and core idea of the present invention. In addition, a person of ordinary skill in the art may, based on the idea of the present invention, make modifications with respect to the specific implementations and the application scope. Therefore, the content of this specification shall not be construed as a limitation to the present invention.

What is claimed is:

1. A system information obtaining method, wherein the system information is for use in a target micro cell in a cluster of micro cells within a primary cell, the method comprising:

obtaining, by a mobile device, from the target micro cell, a first part of system information to be used in the target micro cell, wherein the first part of system information is unique to the target micro cell among other micro cells in the cluster;

receiving, by the mobile device, from the primary cell, a second part of the system information to be used in the target micro cell;

combining the first part of the system information and the second part of the system information to obtain the system information to be used in the target micro cell; and, wherein the second part of system information is a same part of system information used by all micro cells in the cluster; and the first part of the system information to be used in the target micro cell is obtained by the mobile device after the mobile device enters into the target micro cell, wherein the first part of system information is further obtained by the target micro cell from the primary cell for making the first part of system information obtainable to the mobile device.

2. The method according to claim 1, wherein the obtaining of the first part of system information by the target micro cell comprises:

removing, after the target micro cell receives the second part of system information sent by the primary cell, the first part from the second part of system information to be used in the target micro cell.

3. The method according to claim 1, wherein the method comprises:

sending, by the mobile device, a system information request to the primary cell after entering the coverage area of the target micro cell.

4. The method according to claim 3, wherein the first part of system information to be used in the target micro cell is obtained by the target micro cell by removing, after the target micro cell receives the second part of system information sent by the primary cell, the second part of system information from the system information to be used in the target micro cell.

5. The method according to claim 1, wherein the method comprises:

receiving, by the mobile device after entering the coverage area of the target micro cell, the first part of system information to be used in the target micro cell according to location information of the mobile device.

6. The method according to claim 5, wherein the first part of system information to be used in the target micro cell is obtained by the target micro cell by removing, after the target micro cell receives the second part of system information sent by the primary cell, the second part of system information from the system information to be used in the target micro cell.

7. An apparatus for mobile communication to obtain system information, wherein the system information is for use in a target micro cell in a cluster of micro cells within a primary cell, comprising:

an interface circuit, configured to obtain, from the target micro cell, a first part of system information to be used in a target micro cell, wherein the first part of system information is unique to the target micro cell among other micro cells in the cluster;

the interface circuit, configured to receive, from the primary cell, a second part of the system information to be used in the target micro cell;

a processor, configured to combine the first part of the system information and the second part of the system information to obtain the system information to be used in the target micro cell; and, wherein the second part of system information is a same part of system information used by all micro cells in the cluster; and the first part of the system information to be used in the target micro cell is obtained by the mobile device after the mobile device enters into the target micro cell, wherein the first part of system information is further obtained by the target micro cell from the primary cell for making the first part of system information obtainable to the mobile device.

8. The apparatus according to claim 7, wherein the obtaining of the first part of system information by the target micro cell comprises:

removing, after the target micro cell receives the second part of system information sent by the primary cell, the first part from the second part of the system information to be used in the target micro cell.

9. The apparatus according to claim 8, wherein the interface circuit is configured to: after the apparatus enters the coverage area of the target micro cell, send a system information request to the primary cell.

10. The apparatus according to claim 9, wherein the first part of the system information to be used in the target micro cell is obtained by the target micro cell by removing, after the target micro cell receives the second part of system information sent by the primary cell, the second part of system information from the system information to be used in the target micro cell.

11. The apparatus according to claim 7, wherein the interface circuit is configured to: after the apparatus enters the coverage area of the target micro cell, receive the first part of the system information to be used in the target micro cell.

12. The apparatus according to claim 11, wherein the first part of system information to be used by the target micro cell is obtained by the target micro cell by removing, after the target micro cell receives the second part of system information sent by the primary cell, the second part of system information from the system information to be used in the target micro cell.

* * * * *